US005313395A

United States Patent [19]

Kawai et al.

[11] Patent Number: 5,313,395

[45] Date of Patent: May 17, 1994

[54] SPEED CONTROL SYSTEM FOR AN INTERNAL COMBUSTION ENGINE

[75] Inventors: Katsuhiko Kawai, Kariya; Tasunori Kato, Nagoya; Katsuhiko Nakabayashi, Handa; Shigenori Isomura, Kariya; Hisashi Iida, Ama; Toshio Kondo, Kariya, all of Japan

[73] Assignee: Nippondenso Co. Ltd., Aichi, Japan

[21] Appl. No.: 752,655

[22] PCT Filed: Dec. 25, 1990

[86] PCT No.: PCT/JP90/01684

§ 371 Date: Oct. 24, 1991

§ 102(e) Date: Oct. 24, 1991

[87] PCT Pub. No.: WO91/10057

PCT Pub. Date: Jul. 11, 1991

[30] Foreign Application Priority Data

Dec. 25, 1989 [JP] Japan ................................ 1-336090

[51] Int. Cl.$^5$ ...................... F02D 41/16; G06F 15/20

[52] U.S. Cl. ........................... 364/431.07; 364/424.1; 123/339

[58] Field of Search ........... 364/431.07, 424.1, 431.05, 364/431.01; 123/339, 352

[56] References Cited

U.S. PATENT DOCUMENTS

| | | | |
|---|---|---|---|
| 4,691,675 | 9/1987 | Iwaki | 123/352 |
| 4,725,969 | 2/1988 | Onogi et al. | 364/431.07 |
| 4,785,779 | 11/1988 | Takao et al. | 123/339 |
| 4,785,780 | 11/1988 | Kawai | 123/339 |
| 4,883,034 | 11/1989 | Yashiki et al. | 364/431.07 |
| 4,895,118 | 1/1990 | Nakamura | 123/339 |
| 4,989,565 | 2/1991 | Shimomura et al | 123/339 |
| 5,067,080 | 11/1991 | Farman | 364/431.01 |
| 5,091,854 | 2/1992 | Yoshimura et al. | 364/424.1 |

FOREIGN PATENT DOCUMENTS

| | | |
|---|---|---|
| 63-75334 | 4/1988 | Japan . |
| 63-28225 | 6/1988 | Japan . |
| 63-40929 | 8/1988 | Japan . |
| 1-8336 | 1/1989 | Japan . |

*Primary Examiner*—Thomas G. Black
*Assistant Examiner*—Tan Q. Nguyen
*Attorney, Agent, or Firm*—Cushman, Darby & Cushman

[57] ABSTRACT

The digital control unit of the present invention relates to improvements in what is called recent control, and more particularly relates to the idle rotating speed control unit of an internal combustion engine in which the idle rotating speed can be quickly converged to the target rotating speed in the case where a load given from the outside varies. Especially, when the value of the state variable is reversely calculated from the state in which open loop control is conducted, the initial value can be accurately determined.

17 Claims, 23 Drawing Sheets

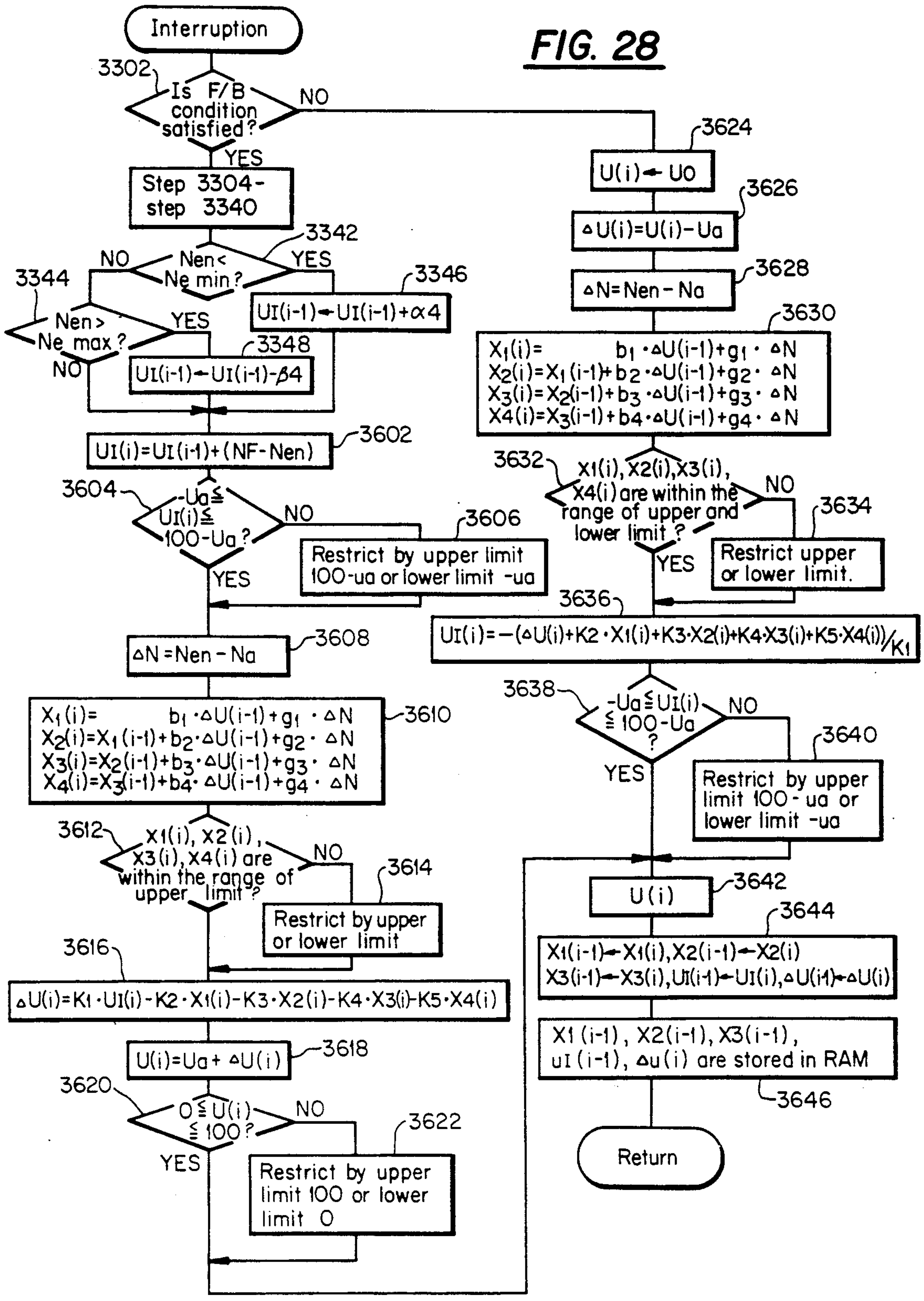
Interruption
3302
Is F/B condition satisfied?
NO
YES
Step 3304-step 3340
3342
Nen< Ne min?
NO
YES
3344
Nen> Ne max?
YES
NO
3346
UI(i-1)←UI(i-1)+α4
3348
UI(i-1)←UI(i-1)-β4
UI(i)=UI(i-1)+(NF-Nen)
3602
3604
-Ua≦ UI(i)≦ 100-Ua?
NO
YES
3606
Restrict by upper limit 100-ua or lower limit -ua
ΔN=Nen-Na
3608
X1(i)= b1·ΔU(i-1)+g1·ΔN
X2(i)=X1(i-1)+b2·ΔU(i-1)+g2·ΔN
X3(i)=X2(i-1)+b3·ΔU(i-1)+g3·ΔN
X4(i)=X3(i-1)+b4·ΔU(i-1)+g4·ΔN
3610
3612
X1(i), X2(i), X3(i), X4(i) are within the range of upper limit?
NO
3614
Restrict by upper or lower limit
3616
ΔU(i)=K1·UI(i)-K2·X1(i)-K3·X2(i)-K4·X3(i)-K5·X4(i)
U(i)=Ua+ΔU(i)
3618
3620
0≦U(i) ≦100?
NO
YES
3622
Restrict by upper limit 100 or lower limit 0
FIG. 28
3624
U(i)←U0
3626
ΔU(i)=U(i)-Ua
3628
ΔN=Nen-Na
3630
X1(i)= b1·ΔU(i-1)+g1·ΔN
X2(i)=X1(i-1)+b2·ΔU(i-1)+g2·ΔN
X3(i)=X2(i-1)+b3·ΔU(i-1)+g3·ΔN
X4(i)=X3(i-1)+b4·ΔU(i-1)+g4·ΔN
3632
X1(i), X2(i), X3(i), X4(i) are within the range of upper and lower limit?
NO
YES
3634
Restrict upper or lower limit.
3636
UI(i)=-(ΔU(i)+K2·X1(i)+K3·X2(i)+K4·X3(i)+K5·X4(i))/K1
3638
-Ua≦UI(i) ≦100-Ua ?
NO
YES
3640
Restrict by upper limit 100-ua or lower limit -ua
U(i)
3642
3644
X1(i-1)←X1(i),X2(i-1)←X2(i)
X3(i-1)←X3(i),UI(i-1)←UI(i),ΔU(i-1)←ΔU(i)
X1(i-1), X2(i-1), X3(i-1), uI(i-1), Δu(i) are stored in RAM
3646
Return

SPEED CONTROL SYSTEM FOR AN INTERNAL COMBUSTION ENGINE

BACKGROUND OF THE INVENTION

1. Field of Invention

The present invention relates to a digital control unit, and more particularly relates to a unit to control an idling engine speed in such a manner that: consideration is given to the internal state of a system to control the idling speed of an internal combustion engine; the system is grasped as a dynamic system; and the idling engine speed is controlled corresponding to a control value which is found in accordance with a state variable which determines the internal state.

2. Description of the Related Art

Conventionally, this kind of idling speed control unit of an internal combustion engine has been disclosed, for example, in the official gazette of Japanese Patent Application Laid Open No. 145339-1984. In this official gazette is shown a composition characterized in that: when the engine condition is changed from the one in which the idling engine speed is not fed back, to the one in which the idling engine speed is fed back, the engine speed can be smoothly changed to a target value.

However, in the composition shown in the aforementioned official gazette, when it has been judged that the feedback control of the engine speed is started, the initial values of the state variable used when the control value to control the engine speed is found, and the initial value of the integral term of the deviation between the detected engine speed and the target engine speed, are given in accordance with the engine speed detected when the throttle valve has been completely opened, and the engine speed detected when it has been judged that feedback control is started. Therefore, the initial value of the state variable and that of the integral term must be prepared corresponding to the engine speed detected when the throttle valve has been completely closed, and the engine speed detected when it has been judged that feedback control is started. Even when the initial values are finely set corresponding to the aforementioned engine speed, as the internal state of the system to control the idling speed of an internal combustion engine and the engine speed can not be determined definitely, it is not clear whether the given initial values are appropriate or not. Therefore, there is a possibility that the convergence to the target engine speed is deteriorated depending on a case.

Accordingly, the present invention has been achieved to solve the aforementioned problems. It is a primary object of the present invention to provide a digital control unit characterized in that: the convergence to a target engine speed can be improved when the engine condition is changed from the one in which the aforementioned actuator is driven without any relation with the internal state of an internal combustion engine, to the one in which the aforementioned actuator is driven by the value which is set according to the internal state of the internal combustion engine.

When a disturbance load such as a load of an air-conditioner is given to an engine, the transient response of the idling engine speed is conventionally improved by correcting a value computed by feedback control in accordance with the disturbance.

In the case of an idling speed control unit of an internal combustion engine, consideration is given to the operable range of an actuator (for example, an idling speed control valve) to control the idling engine speed, and the finally outputted control value (the duty ratio of a duty signal to control a control solenoid) is generally controlled so that it can be within a predetermined upper and lower limit (0–100%). As shown in the official gazette of Japanese Patent Application Laid Open No. 43942-1984, the upper and lower limit are also set to the integral value and the state variable, in order to prevent the actuator from being affected when the control value found by the previous calculation timing used for determining the finally outputted control value, the state variable determined by the detected engine speed, and the integral value of the deviation between the target engine speed and the detected engine speed, become excessively high or low.

Therefore, when the conventional composition in which the calculation value obtained by feedback control is corrected by the correction in accordance with a disturbance, is applied to the aforementioned apparatus in which the upper and lower limit are set to the final control value, the integral value, and the state variable, the following problems are caused: even when the detected engine speed is higher than the target engine speed and the final control value is made minimum, the correction is added as a load disturbance is given, so that the engine speed can not be reduced to not more than the value which is larger than the lower limit of the final control value by a predetermined value. In this case, the idle speed control valve is maintained in a condition in which it is opened by a predetermined open value. Therefore, the detected engine speed can not be converged to the target engine speed, so that there is a possibility that the engine speed is maintained high.

Consequently, the second object of the present invention is to provide an improved digital control unit which is characterized in that: when the control value is corrected in the manner of feedforward, giving consideration to the influence caused by a load disturbance, the detected engine speed can be very precisely controlled to the target engine speed, without causing the aforementioned problems.

The third object of the present invention is to provide a digital control unit characterized in that: a highly precise dynamic model of low degree is constructed, and very accurate control can be conducted according to the constructed dynamic model.

SUMMARY OF THE INVENTION

In the present invention, even while the present control value is set without any relation to the present state variable, the state variable is always set.

Accordingly, even when the engine condition is changed from the condition in which the present control value is set without any relation to the present state variable, to the condition in which the present control value is set according to the present state variable, the convergence to the target value can be greatly improved since the present state variable has already been set.

In the present invention, when the change of load state is detected, the integral value is corrected in the manner of feedforward before the integral value is restricted within a predetermined range in accordance with the change of state, so that the integral value can be fully changed within the predetermined range, and the control value is also fully changed within a predetermined value even when a feedforward correction is conducted according to a load disturbance. Therefore, the conventional problems can be solved which are described as follows: even when the detected engine speed is higher than the target engine speed and the final control value is made minimum, the correction is added as a load disturbance is given, so that the engine speed can not be reduced to not more than the value which is larger than the lower limit of the final control value by a predetermined value; the idle speed control valve is maintained in a condition in which it is opened by a predetermined open; and therefore, the detected engine speed can not be converged to the target engine speed, so that there is a possibility that the engine speed is maintained high. Accordingly, the detected engine speed can be accurately converged to the target engine speed.

In the composition of the present invention, when a dynamic model of the control system is constructed, consideration is given to dead time, and more particularly a portion of dead time and a portion after that are divided so that the dynamic model is identified with a discrete system. The entire dynamic model is previously constructed on the basis of the identified dynamic model. When the dynamic model is constructed giving consideration to dead time, a highly precise dynamic model can be obtained. In the present invention, on the basis of the previously constructed dynamic model, the state variable is determined according to the control input and output, and the control input is outputted according to the determined state variable, so that highly precise control can be realized with a simple structure (using a dynamic model of low degree).

When the present invention is applied to the control of idling speed of an internal combustion engine, highly accurate idling engine speed control can be realized using a dynamic model of low degree, in other words, using a simple structure.

BRIEF DESCRIPTION OF THE DRAWINGS

FIG. 14 and FIG. 28 are flow charts showing an essential content of other embodiments.

DESCRIPTION OF THE PREFERRED EMBODIMENTS

Figure 1:
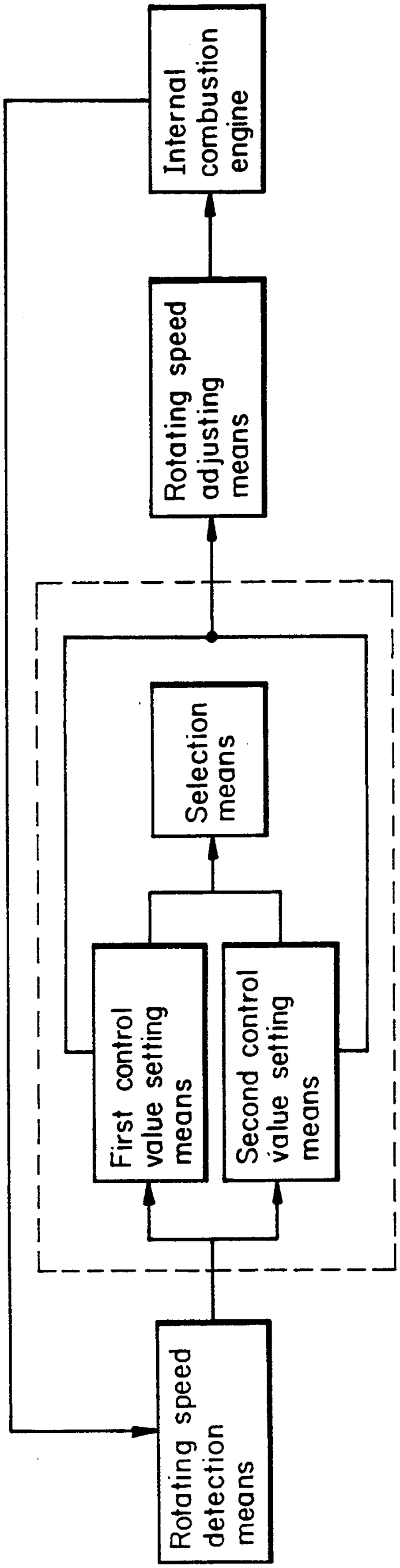
FIG. 1 is a block diagram of the present invention.

An embodiment will be explained as follows. As shown in FIG. 1, the block of this embodiment is an idling speed control unit of an internal combustion engine, comprising: a rotating speed detecting means to detect the engine speed of an internal combustion engine; a rotating speed adjusting means to adjust the engine speed of the internal combustion engine; and a control means which calculates a control value to control the aforementioned rotating speed adjusting means at a predetermined cycle so that the detected rotating speed which has been detected by the aforementioned rotating speed detecting means, can coincide with a desirable target rotating speed, and which outputs a control signal according to the control value. The aforementioned control means is provided with: the first control value setting means which sets a state variable according to the aforementioned detected rotating speed, a state variable set by the previous operation timing, and the aforementioned control value corresponding to the aforementioned control signal outputted to the aforementioned rotating speed adjusting means, and which sets the present control value according to the aforementioned state variable; second control value setting means which sets a state variable according to the aforementioned detected rotating speed, the state variable set by the previous operation timing, and the aforementioned control value corresponding to the aforementioned control signal outputted to the aforementioned rotating speed adjusting means, and which sets the present control value to a value having no relation with the state variable; and a selecting means which selects either the aforementioned first control value setting means or the aforementioned second control value setting means according to the state of the aforementioned internal combustion engine.

Figure 2:
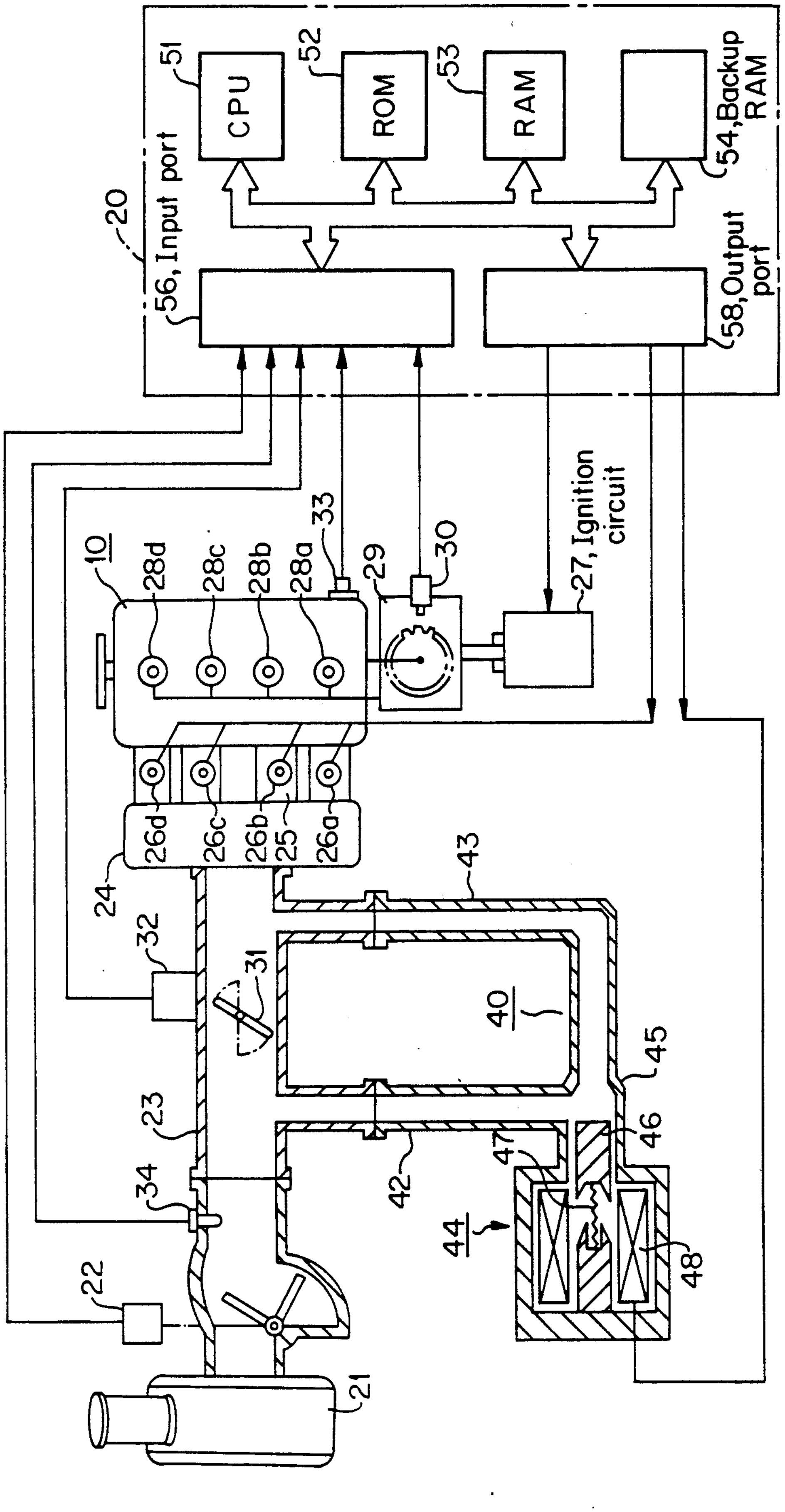
FIG. 2 is a schematic illustration showing an internal combustion engine to which the embodiment of the present invention is applied, and its peripheral equipments.

Referring now to the drawings, an idling speed control unit will be explained to which the present invention is applied. FIG. 2 is a schematic illustration showing an engine 10 in which the idling speed control is explained as follows, and its peripheral equipments are shown. As illustrated in the drawing, in this embodiment, the control of an ignition timing, a fuel injection and an idling speed of the engine 10 is conducted by an electronic control unit 20. However, the control of an idling speed will be mainly explained here. The engine 10 is installed in a vehicle. As illustrated in FIG. 2, the engine 10 is a spark-ignition engine. Suction air is sucked from the upstream to each cylinder through an air cleaner 21, an air flow meter 22, a suction pipe 23, a surge tank 24, and a suction manifold 25. On the other hand, fuel is fed with pressure from a fuel tank not shown in the drawing, and injected from fuel injection valves 26*a*, 26*b*, 26*c*, 26*d* which are provided in a suction manifold 25. The engine 10 is provided with: a distributor 29 which distributes an electric signal of high voltage supplied from an ignition circuit 27, to ignition plugs 28*a*, 28*b*, 28*c*, 28*d* of the cylinders; a rotating speed sensor 30 which is provided in the distributor 29 to detect rotating speed Ne of the engine 10; a throttle sensor 32 which detects opening TH of a throttle valve 31; a warming-up sensor 33 which detects cooling water temperature Thw of the engine 10; and a suction temperature sensor 34 which detects suction temperature Tam of the engine 10. The rotating speed sensor 30 is provided in such a manner that it is opposed to a ring gear which rotates synchronously with the crank shaft of the engine 10, and outputs a pulse signal proportionally to the engine speed in such a manner that 24 pulses are outputted while the engine 10 is rotated one revolution, that is, 720°CA. The throttle sensor 32 outputs an analog signal in accordance with open TH of the throttle valve 31, and outputs an on-off signal sent from an idle switch which detects that the throttle valve 31 is approximately completely closed.

In the suction system of the engine 10 is provided a bypass passage 40 which bypasses the throttle valve 31 and controls air intake AR in an idling operation of the engine 10. The bypass passage 40 is composed of air pipes 42, 43 and an air control valve (referred to as an ISC valve, hereinafter) 44. This ISC valve 44 is essentially a linear solenoid control valve, which variably controls the air passage area between the aforementioned air pipes 42, 43 by adjusting the position of a plunger 46 which is movably set in a housing 45. ISC valve 44 is set in such a manner that: the plunger 46 is usually pushed by a compression coil spring 47 so that the aforementioned air passage area can be zero; and when an exciting current flows in an exciting coil 48, the plunger 46 is driven and the air passage is opened. That is, when the exciting current of the exciting coil 48 is continuously varied, the bypass air flow can be controlled. In this case, the exciting current of the exciting coil 48 is controlled when the duty ratio of a pulse width impressed upon the exciting coil 48 is controlled, that is, when what is called a pulse width modulation PWM is conducted.

In the same manner as the fuel injection valves 26a-26d and the ignition circuit 27, this ISC valve 44 is controlled by the electronic control unit 20. Other than the aforementioned type of valve, a diaphragm control type of valve and a step motor control type of valve are used for ISC valve 44.

The electronic control unit 20 is composed as an arithmetic and logic operation circuit which comprises a widely known central processing unit (CPU) 51, a read only memory (ROM) 52, a random access memory (RAM) 53, and a back-up RAM 54. In the electronic control circuit 20, an input port 56 to which signals of the aforementioned sensors are inputted, and an output port 58 from which control signals are outputted to the actuators, are connected with each other through a bus 59. Air intake AR, intake air temperature Tam, throttle open TH, cooling water temperature Thw, and rotating speed Ne, are inputted into the electronic control circuit 20 through the input port 56 According to the inputted values, fuel injection $\tau$, ignition timing Iq, ISC valve open $\theta$, and the like, are calculated in the electronic unit 20, and control signals are outputted to the fuel injection valves 26a-26d, the ignition circuit 27, and the ISC valve 44 through the output port 58. The control of idling speed will be explained as follows.

In order to conduct the control of idling speed, the electronic control unit 20 is previously designed by the following technique.

(1) Modeling of the Object to be Controlled (Identification)

In this case, an autoregressive moving average model of the degree [n, m] having dead time P (=0, 1, 2, . . . ) is utilized for the model of a system which controls the idling speed of the engine 10, and further consideration is given to a disturbance so that the model can be approximated.

First, the model of a system to control an idling speed, in which an autoregressive moving average model is utilized, can be approximated as follows.

$$Ne(i) = a_1 \cdot Ne(i-1) + a_2 \cdot Ne(i-2) + \ldots + a_n \cdot Ni(i-n) + b_1 \cdot u(i-1-p) + b_2 \cdot u(i-2-p) \ldots + b_m \cdot u(i-m-p) \quad (1)$$

Further, giving consideration to disturbance d, the model of the control system in this case, can be approximated as follows.

$$Ne(i) = a_1 \cdot Ne(i-1) + a_2 \cdot Ne(i-2) + \ldots + a_n \cdot Ni(i-n) + b_1 \cdot u(i-1-p) + b_2 \cdot u(i-2-p) \ldots + b_m \cdot u(i-m-p) + d(i-1) \quad (2)$$

In this embodiment, on the assumption that n=m=2, the autoregressive moving average model of degree [2, 2] is utilized, and delay p due to the sampling time (the dead time) is set to be p=2, and then the following idling speed control system can be obtained.

$$Ne(i) = a_1 \cdot Ne(i-1) + a_2 \cdot Ne(i-2) + b_1 \cdot u(i-3) + b_2 \cdot u(i-4) \ldots \quad (3)$$

Further, in the aforementioned model, consideration is given to disturbance d, and the idling speed control system can be approximated by the following model.

$$Ne(i) = a_1 \cdot Ne(i-1) + a_2 \cdot Ne(i-2) + b_1 \cdot u(i-3) + b_2 \cdot u(i-4) + d(i-1) \ldots \quad (4)$$

In the above equation, u shows a control value of ISC valve 44. In this embodiment, u corresponds to the duty ratio of the pulse signal impressed upon the exciting coil 48, and i is a variable showing the number cf control conducted from the start of the first sampling.

With regard to the model approximated in the manner described above, it is easy to experimentally determine constants $a_1$, $a_2$, $b_1$, $b_2$ of the aforementioned model from transfer function G of the idling speed control system by means of step response. When constants $a_1$, $a_2$, $b_1$, $b_2$ are determined, the model to control the idling speed can be fixed.

Referring to a flow chart shown in FIG. 3, an improved procedure to fix the controlled object will be explained as follows.

Figure 4:
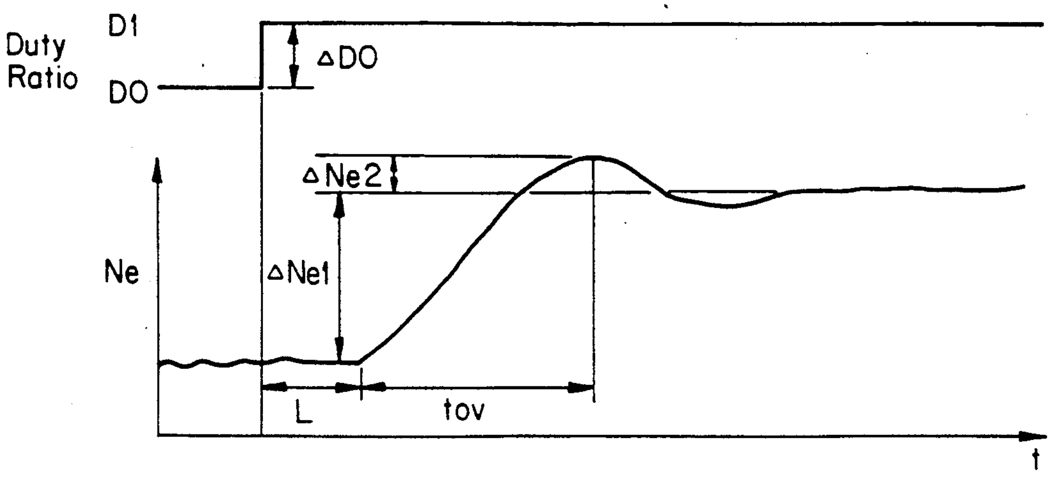
FIG. 4 is a characteristic diagram of a rotating speed with regard to a control signal.

First, in step 101, the step response of the controlled object is observed. Duty ratio signal $D_1 = D_0 + \Delta D$ ($D_0$ is a present duty ratio, and $\Delta D$ is a duty ratio by which the open of ISC valve can be increased by $\Delta\theta$) is outputted so that the opening of SC valve 44 can be increased by a predetermined open $\Delta\theta$, and the behavior of the rotating speed is measured at that time. As shown in FIG. 4, the behavior of the rotating speed is as follows: when a signal of duty ratio $D_1$ which increases the opening of ISC valve 44 by predetermined open $\Delta\theta$, is outputted, rotating speed Ne starts to increase being delayed by dead time L.

Next, in step 102, the model is separated. According to dead time L measured in step 101, the dynamic model of the control system is separated into a portion of dead time L and a portion after that.

In step 103, identification of model is conducted with regard to the portion of dead time L as the first dynamic model. In this case, when dead time L is model identified by a continuous system, transfer function G(s) can be given as follows, and the degree of which is infinite.

$$G_{(s)} = e^{-LS} = 1/\left(1 + \frac{L}{1!} + \frac{L^2}{2!} + \ldots + \frac{L^n}{n!} + \ldots\right)$$

However, when a sampling period $\Delta t$ is set to $$\Delta t = L/N$$

(N is an optional integer), transfer function $G_{a1}(z)$ in the case where dead time L is identified by a discrete system, can be expressed as follows.

$$G_{a1}(z) = 1/z^N$$

In this embodiment, $L=240_{msec}$, and it is set that $N=2$, and $\Delta t=240/2=120_{msec}$.
That is, the following equation is obtained.

$$G_{a1}(z) = 1/z^2 \quad (1)$$

In the above-described equation, u shows a control input of ISC valve 44. In this embodiment, u corresponds to the duty ratio of the pulse signal impressed upon the exciting coil 48, and i is a variable indicating the number of control conducted from the start of the first sampling.

Figure 3:
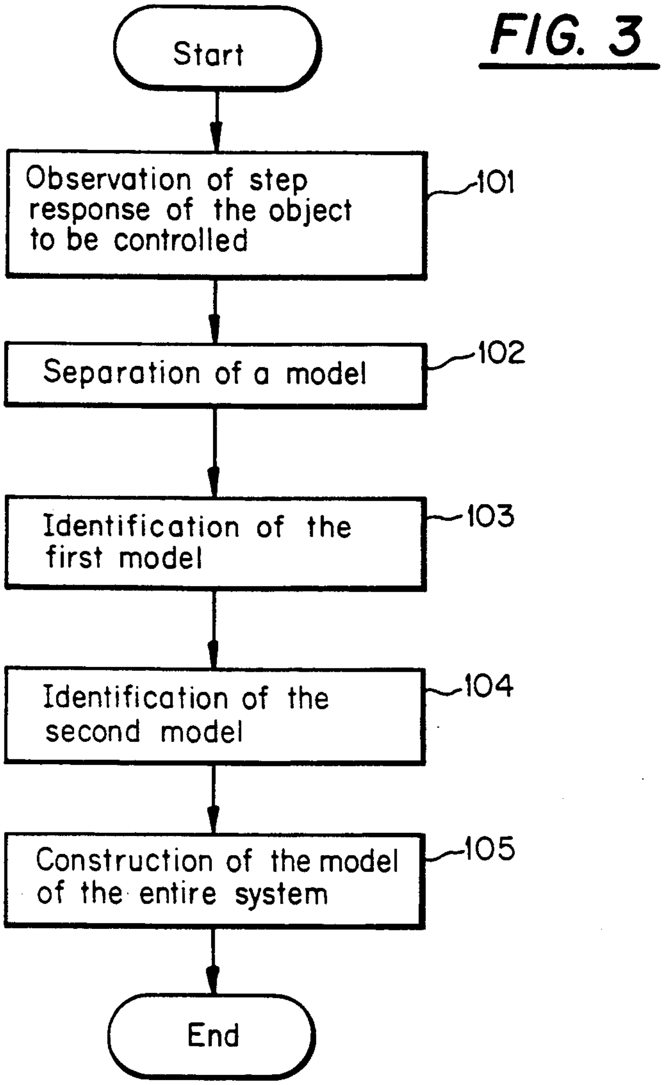
FIG. 3 is a view explaining a modeled operation.

In step 105 shown in FIG. 3, the dynamic model of the discrete system is directly found. The dynamic model of the continuous system is expressed as follows.

$$G_{(s)} = K\omega_m^2/(S^2 + 2T\omega_m S + \omega_m^2)$$

In this case, the raise of rotating speed is $\Delta Ne_1$, the overshoot is $\Delta Ne_2$, the time of occurrence of overshoot is $t_{ov}$, and the variation of overshoot is $\Delta\theta$. Then, the following equations are satisfied.

$$K = \Delta Ne_1/\Delta\theta$$

$$iT = \left(\ln\frac{\Delta Ne_2}{\Delta Ne_1}\right)^2 \Big/ \left\{\pi^2 + \left(\ln\frac{\Delta Ne_2}{\Delta Ne_1}\right)^2\right\}$$

$$\omega_m = \pi/(1 - T^2 \cdot t_{ov})$$

Transfer function Gaz(z) of discrete system may be found by discretizing this transfer function $G_{(s)}$ of the continuous system with sampling period $\Delta t$.

In the aforementioned case, a system is explained in which an idling engine speed is controlled. However, this modeling technique can be applied to any system as far as it function of the duty ratio of the pulse signal which is a control input. The equation (3) is arranged with regard to Ne(z) as follows.

$$Ne(z) = (a_1 z^{-1} + a_2 z^{-2}) \times Ne(z) + (b_1 z^{-3} + b_2 z^{-4}) \times u(z) \quad (3)'$$

In the above-described equation, $z^{-1}$ expresses a time delay operator.

Accordingly, an estimated rotating speed Ne(i) can be estimated by the following equation according to the equation (3)′.

$$Ne(i) = a_1 \cdot Ne(i-1) + a_2 \cdot Ne(i-2) + b_1 \cdot u(i-3) + b_2 \cdot u(i-4) \quad (4)$$

When consideration is given to the disturbance d to the egnation 4, estimated rotating speed Ne(i) can be calculated by the following equation.

$$Ne(i) = a_1 \cdot Ne(i-1) + a_2 \cdot Ne(i-2) + b_1 \cdot u(i-3) + b_2 \cdot u(i-4) + d(i-1) \quad (5)$$

Accordingly, the transfer function of the first dynamic model becomes simple in the discrete system as shown by the equation (1).

Next, in step 104, model identification of the portion after dead time L is conducted as the second dynamic model. The dynamic model of the discrete system in which the sampling period is the aforementioned $\Delta t$, can be expressed by the following transfer function.

$$G_{a2}(z) = (b_1 z + b_2)/(z^2 + a_1 z + a_2) \quad (2)$$

Constants $a_1$, $a_2$, $b_1$, $b_2$ of transfer function $G_{a2}(z)$ can be experimentally found by means of the method of least square.

Finally, in step 105, according to transfer functions $G_{a1}(z)$ and $G_{a2}(z)$ with regard to the dynamic models which are respectively identified in steps 103 and 104, transfer function $G_a(z)$ of the dynamic model of the entire system is constructed as follows, $$G_a(z) = G_{a1}(z) \times G_{a2}(z) = \frac{1}{z^2} \cdot \frac{b_1 z + b_2}{z^2 + a_1 z + a_2} \quad (3)$$

where $G_a(z)=Ne(z)/u(z)$. Ne(z) is a function of the rotating speed which is a control output, and u(z) is a is a system in which the control output is varied after a certain period of time (dead time) has passed after the control input was inputted into the actuator.

As described above, in the improved modeling technique, consideration is given to dead time, and more particularly dead time is separated from the portion after the dead time, and the dynamic model of a control system is identified to each portion by a discrete system. The dynamic model of the entire control system is previously constructed according to the dynamic model identified in the aforementioned manner. When a dynamic model is constructed giving consideration to dead time, a highly accurate dynamic model can be obtained. On the basis of the previously constructed dynamic model, state variables are determined in accordance with a control input and output, and a control input is outputted according to the state variables. Therefore, the following excellent effect can be provided: highly accurate control can be realized with a simple structure (using a dynamic model of a low degree).

When this technique is applied to the idling engine speed control of an internal combustion engine, highly accurate idling engine speed control can be realized with a dynamic model of a low degree, that is, using a simple structure.

When a dynamic model is identified in such a manner that the sampling period set to 1/N of dead time (N is an arbitrary integer) and the dynamic model is identified by a discrete system, the portion of dead time can be identified to a dynamic model of a low degree. Consequently, equations used for the control calculation in the control unit become simple, so that the calculation load can be lessened.

(2) Method to Display State Variable X

When the above described equation (4) is rewritten using state variable $X(i)=[X_1(i)\ X_2(i)\ X_3(i)\ X_4(i)\ X_5(i)]^T$, the following determinant can be obtained.

$$\begin{pmatrix} X_1(i+1) \\ X_2(i+1) \\ X_3(i+1) \\ X_4(i+1) \\ X_5(i+1) \end{pmatrix} = \begin{pmatrix} a_1 & a_2 & 0 & b_1 & b_2 \\ 1 & 0 & 0 & 0 & 0 \\ 0 & 0 & 0 & 0 & 0 \\ 0 & 0 & 1 & 0 & 0 \\ 0 & 0 & 0 & 1 & 0 \end{pmatrix} \begin{pmatrix} X_1(i) \\ X_2(i) \\ X_3(i) \\ X_4(i) \\ X_5(i) \end{pmatrix} + \begin{pmatrix} 0 \\ 0 \\ 1 \\ 0 \\ 0 \end{pmatrix} u(i) + \begin{pmatrix} 1 \\ 0 \\ 0 \\ 0 \\ 0 \end{pmatrix} d(i) \quad (5)$$

Consequently, state variable X(i) can be expressed as follows.

$$\begin{aligned} X_1(i) &= Ne(i), \\ X_2(i) &= Ne(i-1), \\ X_3(i) &= u(i-1), \\ X_4(i) &= u(i-2), \\ X_5(i) &= u(i-3) \end{aligned} \quad (6)$$

(3) Design of a Regulator

The most optimum regulator which is used conventionally is not provided with ability to converge an output to a target value. Consequently, when the idling engine speed is controlled, an extension type of regulator is required in which an error (e(i)=NF(i)−Ne(i)) caused between a target rotating speed and an actual rotating speed is introduced. Accordingly, the target of this embodiment is 69 0.

$$\lim_{i \to \infty} e(i) \to 0.$$

When the apparatus is provided with only one integrator as shown in the official gazette of Japanese Patent Application Laid Open No. 8336-1989, the following problems are caused: when the target rotating speed is changed stepwise (for example, when an air-conditioner is turned on and off, or when a transmission is shifted between N range and D range), the rotating speed converges to the target value without causing a deviation, however, when the target rotating speed varies ramp-wise (for example, in a warming-up operation, in a starting operation, and after racing), the engine speed is controlled while there is a constant amount of deviation. Therefore, the following are aimed at in this embodiment: when the target rotating speed is varied rampwise, calculation is carried out by two integrators; and when the target rotating speed is varied stepwise, or not varied, calculation is carried out by one integrator.

(i) A disturbance d(i) and target rotating speed NF(i) are constant from the conditions $$(1-q^{-1})d(i) = 0,\ (1-q^{-1})NF(i) = 0$$

(where q is a time transition action element) Consequently, when $(1-q^{-1})$ is acted on e(i+1)=NF(i+1)−Ne(i+1)

$$(1-q^{-1})e(i+1) = (1-q^{-1})(NF(i+1) - Ne(i+1)) = -(1-q^{-1})Ne(i+1)$$

where $$(1-q^{-1})Ne(i+1) = a_1(1-q^{-1})x_1(i) + a_2(1-q^{-1})x_2(i) + b_1(1-q^{-1})x_4(i) + b_2(1-q^{-1})x_5(i)$$

Accordingly, the following extension system can be obtained

Ⓐ

$$\begin{pmatrix} (1-q^{-1})x_1(i+1) \\ (1-q^{-1})x_2(i+1) \\ (1-q^{-1})x_3(i+1) \\ (1-q^{-1})x_4(i+1) \\ (1-q^{-1})x_5(i+1) \\ e(i+1) \end{pmatrix} = \begin{pmatrix} a_1 & a_2 & 0 & b_1 & b_2 & 0 \\ 1 & 0 & 0 & 0 & 0 & 0 \\ 0 & 0 & 0 & 0 & 0 & 0 \\ 0 & 0 & 1 & 0 & 0 & 0 \\ 0 & 0 & 0 & 1 & 0 & 0 \\ -a_1 & -a_2 & 0 & -b_1 & -b_2 & 1 \end{pmatrix} \times \begin{pmatrix} (1-q^{-1})x_1(i) \\ (1-q^{-1})x_2(i) \\ (1-q^{-1})x_3(i) \\ (1-q^{-1})x_3(i) \\ (1-q^{-1})x_5(i) \\ e(i) \end{pmatrix} + \begin{pmatrix} 0 \\ 0 \\ 1 \\ 0 \\ 0 \\ 0 \end{pmatrix} (1-q^{-1})u(i)$$

$$e(i) = (0\ 0\ 0\ 0\ 0\ 1) \begin{pmatrix} (1-q^{-1})x_1(i) \\ (1-q^{-1})x_2(i) \\ (1-q^{-1})x_3(i) \\ (1-q^{-1})x_4(i) \\ (1-q^{-1})x_5(i) \\ e(i) \end{pmatrix}$$

When the most appropriate regular is applied to equation (a), the following equation can be obtained $$(1-q^{-1})u(i) = K_1(1-q^{-1})x_1(i) + K_2(1-q^{-1})x_2(i) + K_3(1-q^{-1})x_3(i) + K_4(1-q^{-1})x_4(i) + K_5(1-q^{-1})x_5(i) + K_a e(i)$$

When both sides are divided by $(1-a^{-1})$, the following equation can be obtained.

$$u(i) = K_1x_1(i) + K_2x_2(i) + K_3x_3(i) + K_4x_4(i) + K_5x_5(i) + Ka\frac{1}{1-q^{-1}}e(i)$$

where $1 - q^{-1}$ $$u_1(i) = \frac{Ka}{1-q^{-1}}e(i)$$

Then, the following equation can be obtained.

$$u_f(i)=u_1(i-1)+Ka(NF-Ne(i) \quad (9)$$

Consequently, the control value u(i) of ISC valve 44 can be found by the following equation, wherein |K=[K1, K2, K3, K4, K5] is the most appropriate feedback gain, and Ka is an integral constant.

$$u(i) = K_1Ne(i) + K_2Ne(i-1) + K_3u(i-1) + K_4u(i-2) + K_5u(i-3) + u_1(i) \quad (8)$$

(ii) In the case where disturbance d(i) and target rotating speed are changed rampwise, $$NF(i)-NF(i-1)=NF(i-2)$$

(the gradient is constant)

Namely, $(1-q^{-1})d(i)=0$, $(1-q^{-1})^2NF(i)=0$

Accordingly, when $(1-q^{-1})^2$ is acted on $e(i+1)=NF(i+1)-Ne(i+1)$, the following equation can be obtained.

$$(1-q^{-1})^2e(i+1) = (1-q^{-1})^2(NF(i+1) - Ne(i+1)) = -(1-q^{-1})^2Ne(i+1)$$

where $(1-q^{-1})^2Ne(i+1) = a_1(1-q^{-1})x_1(i) + a_2(1-q^{-1})^2x_2(i) + b_1(1-q^{-1})^2x_4(i) + b_2(1-q^{-1})^2x_5(i)$ Consequently, the following extension system can be obtained.

Ⓑ

$$\begin{pmatrix} (1-q^{-1})^2x_1(i+1) \\ (1-q^{-1})^2x_2(i+1) \\ (1-q^{-1})^2x_3(i+1) \\ (1-q^{-1})^2x_4(i+1) \\ (1-q^{-1})^2x_5(i+1) \\ e(i+1) \\ e(i) \end{pmatrix} = \begin{pmatrix} a_1 & a_2 & 0 & b_1 & b_2 & 0 & 0 \\ 1 & 0 & 0 & 0 & 0 & 0 & 0 \\ 0 & 0 & 0 & 0 & 0 & 0 & 0 \\ 0 & 0 & 1 & 0 & 0 & 0 & 0 \\ 0 & 0 & 0 & 1 & 0 & 0 & 0 \\ -a_1 & -a_2 & 0 & -b_1 & -b_2 & 0 & 0 \\ 0 & 0 & 0 & 0 & 0 & 1 & 0 \end{pmatrix}$$

-continued $$\begin{pmatrix} (1-q^{-1})^2x_1(i) \\ (1-q^{-1})^2x_2(i) \\ (1-q^{-1})^2x_3(i) \\ (1-q^{-1})^2x_4(i) \\ (1-q^{-1})^2x_5(i) \\ e(i) \\ e(i-1) \end{pmatrix} + \begin{pmatrix} 0 \\ 0 \\ 1 \\ 0 \\ 0 \\ 0 \\ 0 \end{pmatrix}(1-q^{-1})^2u(i)$$

$$e(i) = [0\,0\,0\,0\,0\,1\,0] \times \begin{pmatrix} (1-q^{-1})^2x_1(i) \\ (1-q^{-1})^2x_2(i) \\ (1-q^{-1})^2x_3(i) \\ (1-q^{-1})^2x_4(i) \\ (1-q^{-1})^2x_5(i) \\ e(i) \\ e(i-1) \end{pmatrix}$$

$$\because (1-q^{-1})^2e(i+1) = -a_1(1-q^{-1})^2x_1(i) - a_2(1-q^{-1})^2x_2(i) - b_1(1-q^{-1})^2x_4(i) - b_1(1-q^{-1})^2x_5(i)$$

$$(1-2q^{-1}+q^{-2})e(i+1) = -a_1(1-q^{-1})^2x_1(i) - a_2(1-q^{-1)})^2x_2(i) - b_1(1-q^{-1})^2x_4(i) - b_2(1-q^{-1})^2x_5(i)$$

$$e(i+1) = -a_1(1-q^{-1})^2x_1(i) - a_2(1-q^{-1})^2x_2(i) - b_1(1-q^{-1})^2x_4(i) - b_2(1-q^{-1})^2x_5(i) + 2e(i) - e(i-1)$$

When the most appropriate regualtor is applied to equation (B), the following equation can be obtained.

$$(1-q^{-1})^2u(i) = K_1(1-q^{-1})^2x_1(i) + K_2(1-q^{-1})^2x_2(i) + K_3(1-q^{-1})^2x_3(i) + K_4(1-q^{-1})^2x_4(i) + K_5(1-q^{-1})^2x_5(i) + K_ae(i) + K_be(i-1)$$

When both sides are divided by $(1-q^{-1})^2$, the following equation can be obtained.

$$u(i) = K_1x_1(i) + K_2x_2(i) + K_3x_3(i) + K_4x_4(i) + K_5x_5(i) + K_a\frac{1}{(1-q^{-1})^2}e(i) + K_b\frac{1}{(1-q^{-1})^2}e(i-1)$$

Suppose, $u_1(i) = \frac{1}{(1-q^{-1})^2}e(i)$ then the following equation can be obtained $$(1-2q^{-1}+q^{-2})u_1(i)=e(i)$$

that is, $u_1(i)-2u_1(i-1)+u(i-2)=e(i)$

Consequently, the following equation can be satisfied.

$$u_1(i)=2u_1(i-1)-u_1)i-2)+e)(i) \quad (9)$$

Cosequently, the control value u(i) can be found by the following equation.

$$u(i) = K_1Ne(i) + K_2Ne(i-1) + K_3u(i-1) + K_4u(i-2) + K_5u(i-3) + K_au_1(i) + K_bu_1(i-1) \quad (8)'$$

Figure 5:
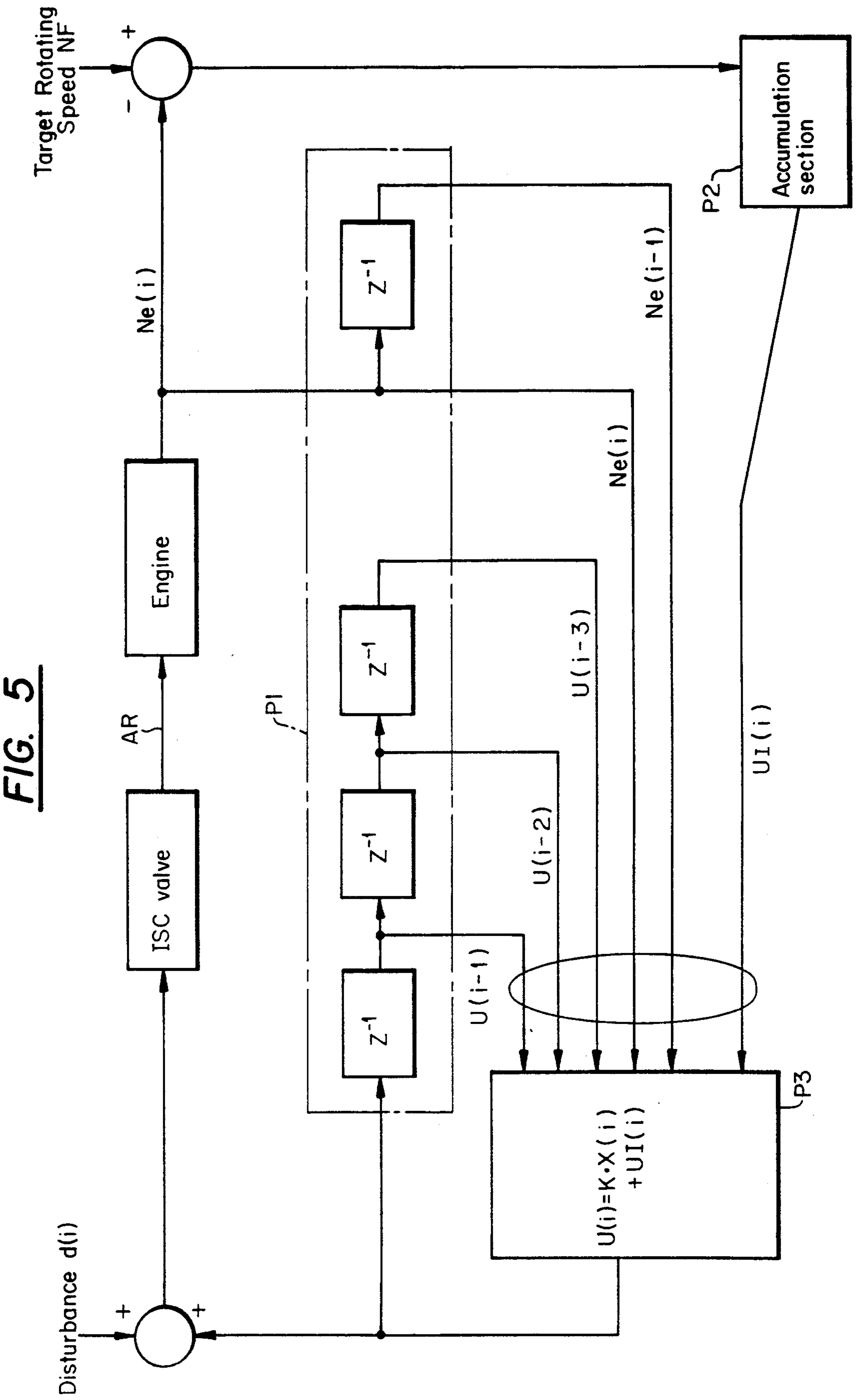
FIG. 5 and FIG. 6 are block diagrams of a system to control an idling engine speed.
Figure 6:
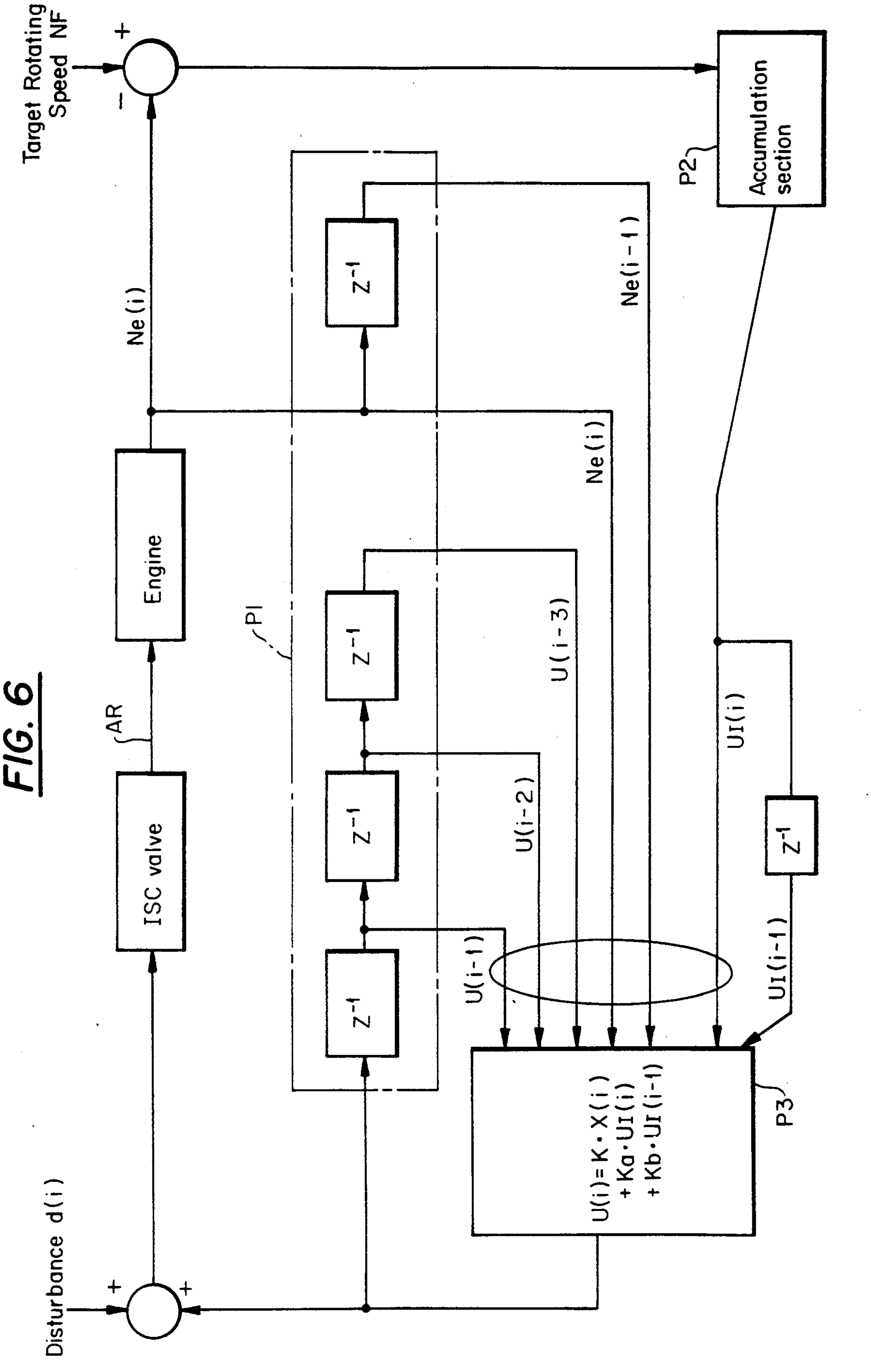

FIG. 5 and FIG. 6 are block diagrams of the idling engine speed control system which is modeled in the aforementioned manner. In FIG. 5 and FIG. 6, the $Z^{-1}$ transformation is used in order to introduce control value u(i−1) from u(i). This corresponds to a process in which the past control value u(i−1) is stored in RAM 53 and read out in the next control so that it can be used.

In FIG. 5 and FIG. 6, block Pl which is enclosed by a one-dotted line represents a portion to determine state variable X(i) under the condition that the rotating speed is fed back to the target rotating speed. Block P2 represents a portion (an accumulated portion) in which the aforementioned integral term $u_I(i)$ is found. Block P3 represents a portion in which the present control value u(i) is calculated from state variable X(i) determined in block P1, and from the integral term $u_I(i)$ found in block P2.

(4) Determination of the Most Optimum Feedback Gain K and

Integral Constants Ka and Kb

For example, the most optimum feedback gain K and integral constants Ka and Kb can be determined by the following technique.

The Most Optimum Servo System

The most optimum feedback gain K and integral constants Ka and Kb are determined so that the following evaluation function can become minimum.

$$J = \sum_{i=0}^{\infty} \{Q(Ne(i) - NF)^2 + R(u(i) - u(i-1))^2\} \quad (10)$$

Evaluation of function J is intended to make the deviation of idling rotating speed Ne(i) as a control output from target rotating speed NF to be minimum while the control value u(i) of ISC valve 44 is being restricted. Weighting of restriction with regard to the control value u(i) can be changed according to parameters Q and R of weighting. Consequently, the most optimum feedback gain $|K=[K_1\ K_2\ K_3\ K_4\ K_5]$ and integral constants Ka and Kb may be determined in such a manner that: the values of weighting parameters Q and R are variously changed and simulation is repeatedly conducted until the most optimum control characteristic can be obtained.

The aforementioned most optimum feedback gain $|K=[K_1\ K_2\ K_3\ K_4\ K_5]$ and integral constants Ka and Kb depend on model constants $a_1$, $a_2$, $b_1$ and $b_2$. In order to guarantee the stability (the robust property) of the system with regard to the variation (the parameter variation) of the system to control the actual idling speed, it is necessary to design the most optimum feedback gain K and integral constants Ka, Kb while consideration is given to model constants $a_1$, $a_2$, $b_1$ and $b_2$. Consequently, the variation of model constants $a_1$, $a_2$, $b_1$ and $b_2$, which can be actually caused, is incorporated into the simulation, and the most optimum feedback gain K and integral constants Ka and Kb are determined so that stability can be satisfied. Other than a secular change such as a permanent set in fatigue of ISC valve 44 and blinding of a bypass passage, a load variation can be considered to be a variation factor. Concerning the most optimum feedback gains K, Ka and Kb, a plurality of them may be previously provided in such a manner that: for example, one is provided for a light load change, and the other is provided for a heavy load change; and the most optimum feedback gains are changed over according to the state of load variation.

Above explanations have been conducted on the modeling of a control object, the method of displaying a state variable, the design of a regulator, and the determination of the most optimum feed back gain. These are previously determined and found, so that the actual control is conducted in the electronic control unit 20 using the results, that is, using only the equations (8) and (9) or the equations (8)′ and (9)′.

Only when the state of the engine 10 satisfies a predetermined feed back executing condition, the feed back processing is conducted in this embodiment using the equations (8) and (9) or the equations (8)′ and (9)′. When the feed back condition is not satisfied (in an open state), the processing in which the equations (8) and (9) or the equations (8)′ and (9)′ is not executed in the electronic control unit 20, and the control value of ISC valve 44 is determined according another predetermined processing. Further, in this embodiment, the processing to prepare for the following feed back processing is executed in an open state at each computing timing to determine the control value.

Referring to FIG. 7, FIG. 8, FIG. 9 and FIG. 10, the processing executed in CPU51 in the electronic control unit 20 will be explained as follows, into which not only the feed back processing but also the open processing in an opening state is incorporated.

Figure 7:
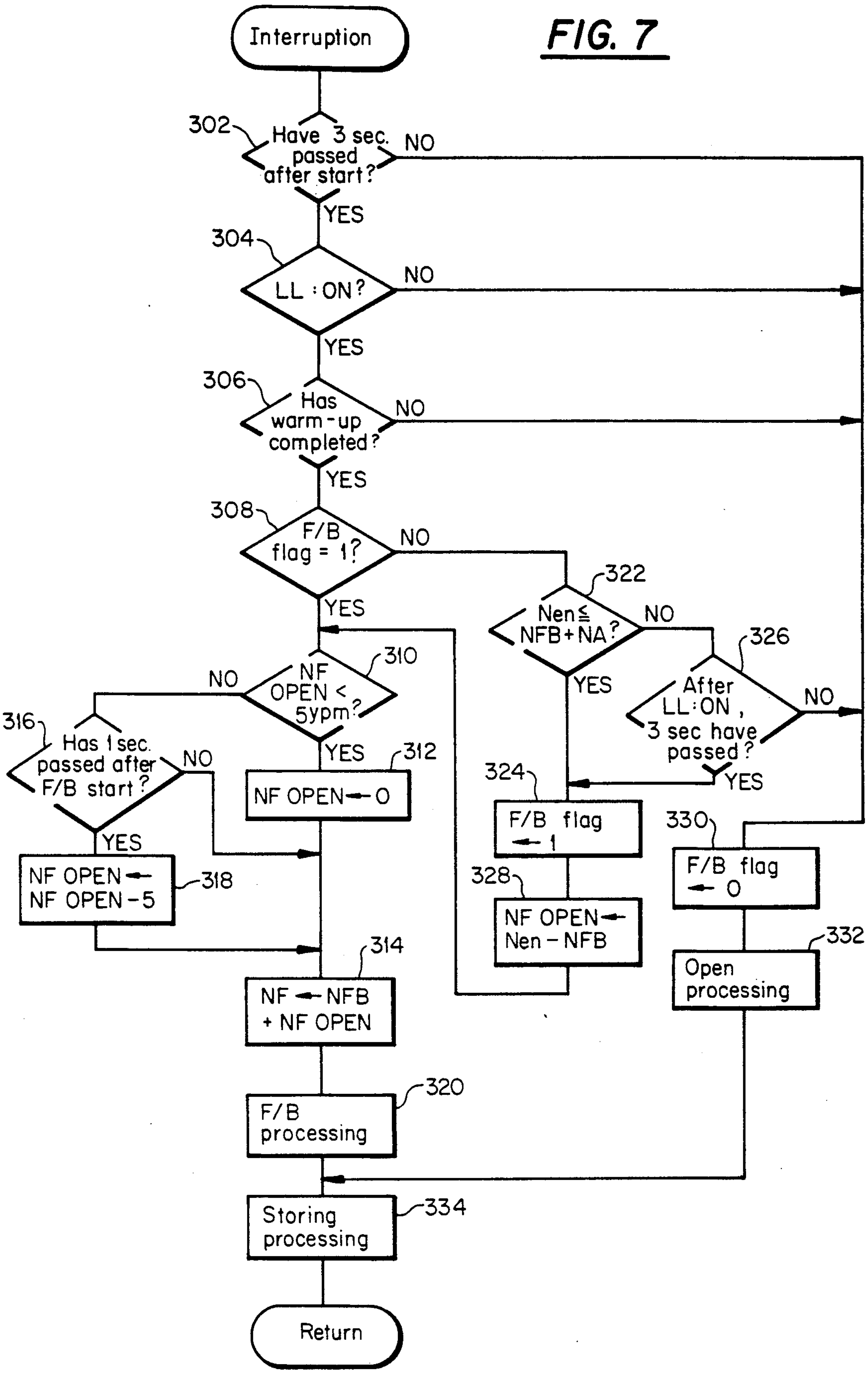
FIG. 7 and FIG. 10 are flow charts of an ISC valve control program in the case where one integrator is provided.

The flow chart shown in FIG. 7 is a control program of ISC valve 44 which is conducted in the manner of interruption at each predetermined time (for example, 100 msec) under the condition that an IG switch not shown in the drawing is closed.

When the interruption processing is started, it is judged in step 302 whether 3 seconds has passed after the start of the engine 10 or not. The object of the aforementioned judgment is to start the control from when the engine condition has become stable, getting out of an unstable condition of engine start. For example, the completion of an engine start operation is judged when rotating speed Ne of the engine 10 has exceeded 500 rpm.

When it is judged in step 302 that 3 seconds have passed after engine start, the process advances to step 304, and it is judged whether the throttle valve 31 is completely closed and the idle switch is turned on (LL:ON) or not. When it is judged in step 304 that LL:ON, the process advances to step 306, and it is judged whether a warm-up operation has been completed or not. When the warm-up operation has been completed, the process advances to step 308.

In step 308, it is judged whether a flag (an F/B flag) which is set to 1 when feed back (F/B) processing is carried out, is 1 or not. When F/B flag=1, the process advances to step 310. In step 310, it is judged whether a target value raise NFOPEN which is set right after the state has been changed from an open state to a feed back processing executing state, is not more than 5 rpm. When NFOPEN<5 rpm, the raise NFOPEN is made 0 in step 312, and then the process advances to step 314. When NFOPEN≧5 rpm, it is judged in step 316 whether 1 second has passed or not after the F/B processing has been started. When 1 second has not passed yet, the process advances to step 314. When 1 second has passed, the raise NFOPEN is corrected to a value smaller by 5 rpm (NFOPEN←NFOPEN−5 rpm), and then the process advances to step 314. In step 314, the aforementioned raise NFOPEN is added to a reference rotaitng speed NFB (for example, 700 rpm) so that a target rotating speed NF is determined.

In step 320, an F/B processing which will be described later, is carried out corresponding to the target rotating speed NF determined in the aforementioned step 314.

On the other hand, when it is judged in the aforementioned step 308 that F/B flag=0, the process advances to step 322, and the latest rotating speed Nen obtained according to the signal of the rotating speed sensor 30 is compared with the reference rotating speed to which a predetermined value NA (for example, 200 rpm) is added. When Nen≦NFB+NA, the process advances to step 324. When Nen>NFB+NA, the process advances to step 326. In step 326, it is judged whether 3 seconds have passed after LL:ON, or not. When 3 seconds have passed, the process advances to step 324.

In step 324, the F/B flag is set to 1 and then the process advances to step 328. In step 328, the raise NFOPEN is found by subtracting the reference rotating speed NFB from the latest rotating speed Nen, and then the process advances to the aforementioned step 310. Accordingly, the rotating speed at the time when it is judged that F/B processing is started, is set to the initial value of the target rotating speed NF at the time of the start of F/B processing, by the processing of step 328.

The process advances to step 330 in the following cases: in step 302, 3 seconds have not passed after the start; in step 304, LL:OFF; in step 306, warming-up has not been completed; and in step 326, 3 seconds have not passed after LL:ON. In step 330, the F/B flag is set to 0, and in step 332, an open processing which will be described later is carried out.

After the processing in step 320 or step 332 has been completed, storing processing to prepare for the following feed back processing, which will be described later, is carried out, and the control program is once completed, and then another engine control program is started.

Figure 8:
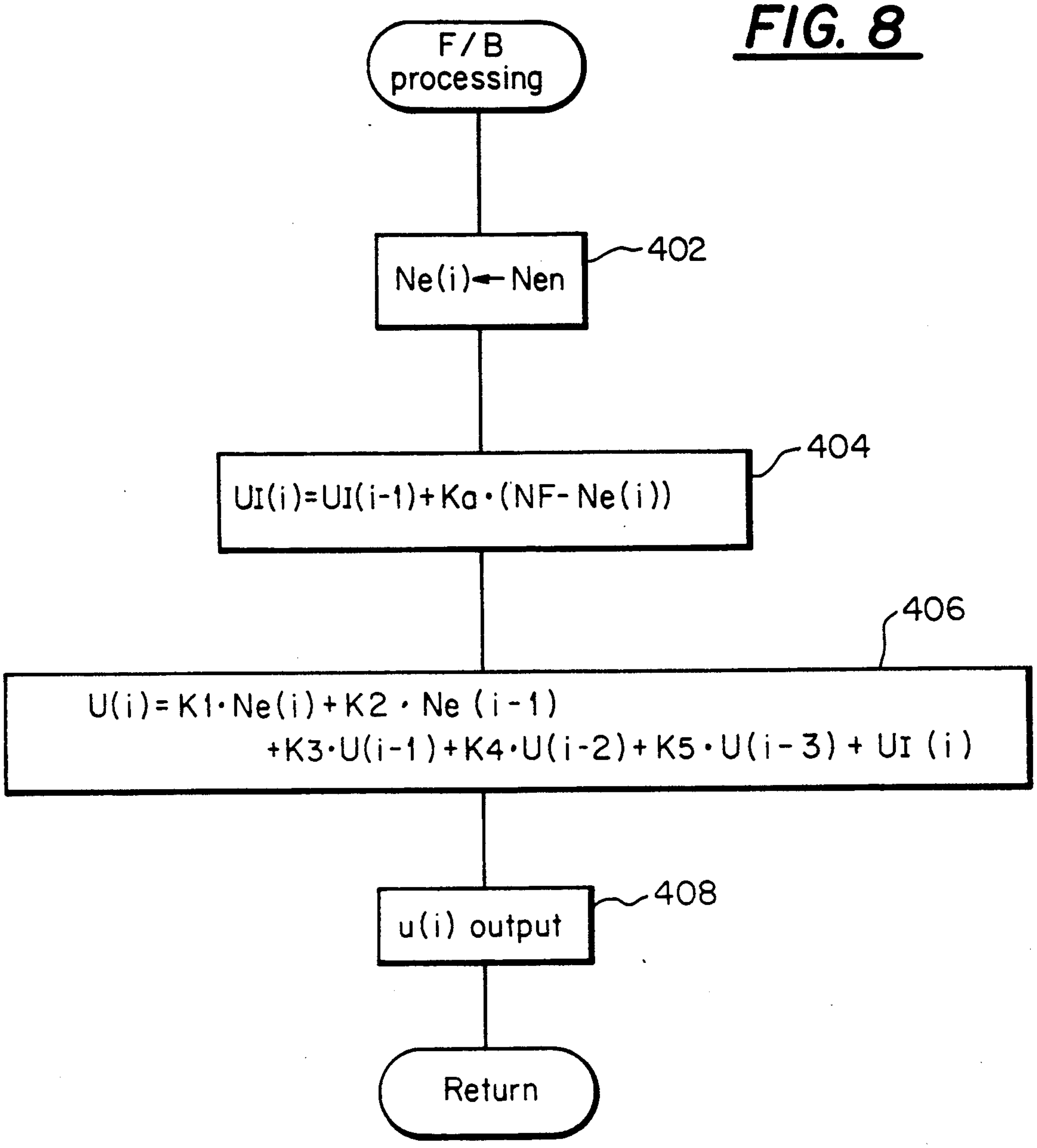

The flow chart in FIG. 8 shows a case in which the disturbance and target rotating speed are constant in the F/B processing in step 320, and the processing according to the aforementioned equations (8) and (9) is carried out. Specifically, the latest rotating speed Nen is substituted into Ne(i) in step 402, and then the operation of the aforementioned equation (9) is carried out in step 404 so that $u_I(i)$ is found, and the operation of the equation (8) is carried out in step 406 so that the present control value u(i) is found. Then, a control signal of the duty ratio according to the present control value u(i) which has been found in the manner described above, is outputted from an output port 58 to ISC valve 44.

The latest rotating speed Nen is set to Ne(i) for calculation. The deviation of Ne(i) from the target rotating speed NF is added to an integral term $u_I(i-1)$ which was found by the previous processing and stored in RAM53 so that the present $u_I(i)$ can be determined. Then, the present state variable [Ne(i) Ne(i−1) u(i−1) u(i−2) u(i−3)] is determined from Ne(i) and the previous state variables Ne(i−1), u(i−1), u(i−2), u(i−3) which are stored in RAM53 being prepared for the present F/B processing. The present state variable and the most optimum feed back gain are calculated by means of a matrix calculation, and further $Ka \cdot u_I(i)$ is added so that the present control value u(i) is determined.

Figure 9:
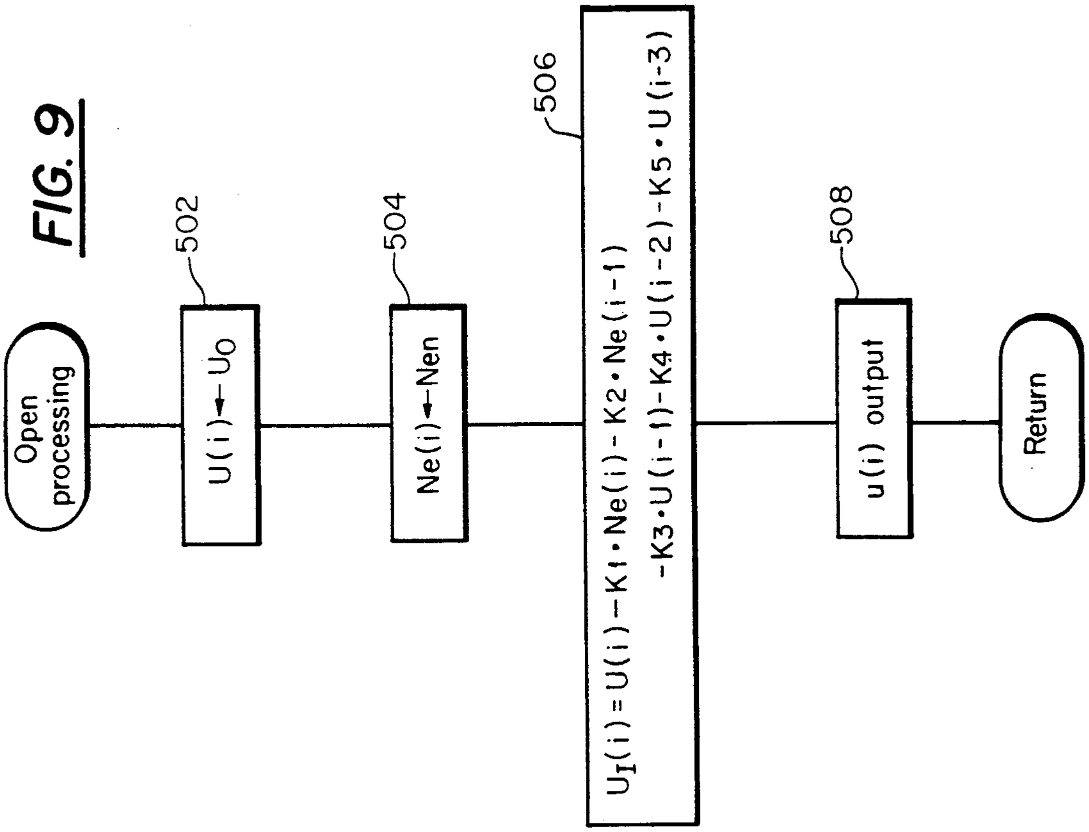

FIG. 9 is a flow chart showing an open processing of step 332. In this open processing, the present control value u(i) is set to a predetermined value $u_0$ in step 502. The predetermined value $u_0$ may be an arbitrary constant value as a duty ratio such as 100%, 0% and 50%, and it may be a value which can be determined in accordance with a detected parameter such as cooling water temperature Thw.

In step 504, the latest rotating speed Nen is substituted into Ne(i). In step 506, the control value u(i) which has been set in the present time according to the equation (8), and the integral time $u_I(i)$ which agrees with the present state variable, are reversely calculated according to: Ne(i) which has been set in step 504; Ne(i−1), u(i−1), u(i−2), and u(i−3) which are stored in RAM53; and the present control value u(i) which has been set in step 502.

The state variable at the open processing can be expressed by [Ne(i) Ne(i−1) u(i−1) u(i−2) u(i−3)] using Ne(i) which has been set in step 504 and Ne(i−1), u(i−1), u(i−2), u(i−3) which are sotered in RAM 53.

In step 508, a control signal of a duty ratio is outputted to ISC valve 44 from the output port 58 in accordance with the present control value u(i) which has been set in step 502.

Referring now to the flow chart in FIG. 10, the storing processing of step 334 will be explained. First, in step 602, Ne(i), u(i−2), u(i−1) in the state variable which has been set either in step 320 (F/B processing) conducted right before or step 332 (open processing), are respectively substituted into Ne(i−1), u(i−3), u(i−2). Further, the present control values u(i) and uI(i) which have been determined in the aforementioned step 320 or step 332, are respectively substituted into u(i−1) and $u_I(i-1)$.

Next, in step 604, Ne(i−1), u(i 3), u(i−2), u(i−1), $u_I(i-1)$ which have been determined in the aforementioned step 602, are stored in RAM 53.

In the aforementioned storing processing, the state variable which is stored preparing for a reverse calculation of u(i) in the following F/B processing and open processing, is renewed and stored, using Ne(i), u(i−2), u(i−1) which were utilized in steps 320, 332, and the control value u(i) which was determined in those steps. The value of $u_I(i)$ which was determined in step 320 (F/B processing) is stored, preparing for the following F/B processing. Further, $u_I(i)$ calculated in step 332 (open processing) is also stored as an initial value which is used when $u_I(i)$ is calculated by the equation (9). In this embodiment, after $u_I(i)$ has been changed into a form which is used for the following processing of calculation timing (step 602), $u_I(i)$ is stored.

Consequently, according to the control program of the aforementioned ISC valve 44, even in an open state, the state variable stored in RAM 53 is renewed according to the rotating speed in the open state and the control value of ISC valve 44. In the open state, the initial value of uI is calculated from the state variable and the control value at the time when the open processing is carried out, preparing for the following F/B processing, so that the state variable used for F/B processing when the state is changed from the open state to the F/B state, and the initial value of uI express the state of the system which controls the idling speed in the open state immediately before. Consequently, the variation of the rotating speed right after the state has been changed to the F/B state can be made very smooth. Since the most optimum state variable can be determined right after F/B control has started, the rotating speed can be quickly converged to the target rotating speed.

In the aforementioned processing, the initial value of the target rotating speed NF at the time when the state has been changed from the open state to the F/B state so that the F/B processing is started, is made equal to the actual rotating speed Ne at the time when it has been judged that the F/B processing is started.

For example, in the case where the target rotating speed is determined at the time F/B processing starts without any relation with the actual rotating speed, a deviation is caused between the target rotating speed and the actual rotating speed at the start of the F/B processing, and in some cases, the actual rotating speed is higher than the target rotating speed by 400–500 rpm. When the F/B processing is started under the condition described above, a large deviation is generated, and ISC valve 44 is controlled so that it can be suddenly closed due to the large deviation. When a load is given, for example, an air-conditioner installed in the vehicle is turned on, in the aforementioned condition in which the actual rotating speed is being lowered, the rotating speed is excessively lowered and the actual rotating speed excessively misses the target rotating speed, and there is a possibility of engine stall. However, the initial value of the target rotating speed is set in the manner described above at the start of F/B control operation, and the aforementioned problems can be solved. In the aforementioned processing, the raise NFOPEN at the start of F/B control is set so that it can be the difference value between the actual rotaing speed Nen and the reference rotating speed NFB, and this raise NFOPEN is held for 1 second after F/B. Accordingly, for example, when a vehicle speed is lowered from the state of deceleration to the state of idling so that the state becomes an F/B control state, the slowdown of rotating speed can be restricted, and a sharp decrease in the rotating speed can be prevented.

Further, the raise NFOPEN is reduced to zero by a predetermined value after 1 sec has passed after the start of F/B, so that the actual rotating speed is smoothly lowered to the reference rotating speed NFB following the decrease in the target rotating speed NF.

According to the aforementioned processing, the rotating speed is very smoothly changed from the open state to the F/B state, so that a very stable idling condition can be obtained and drivability can be remarkably improved.

Figure 10:
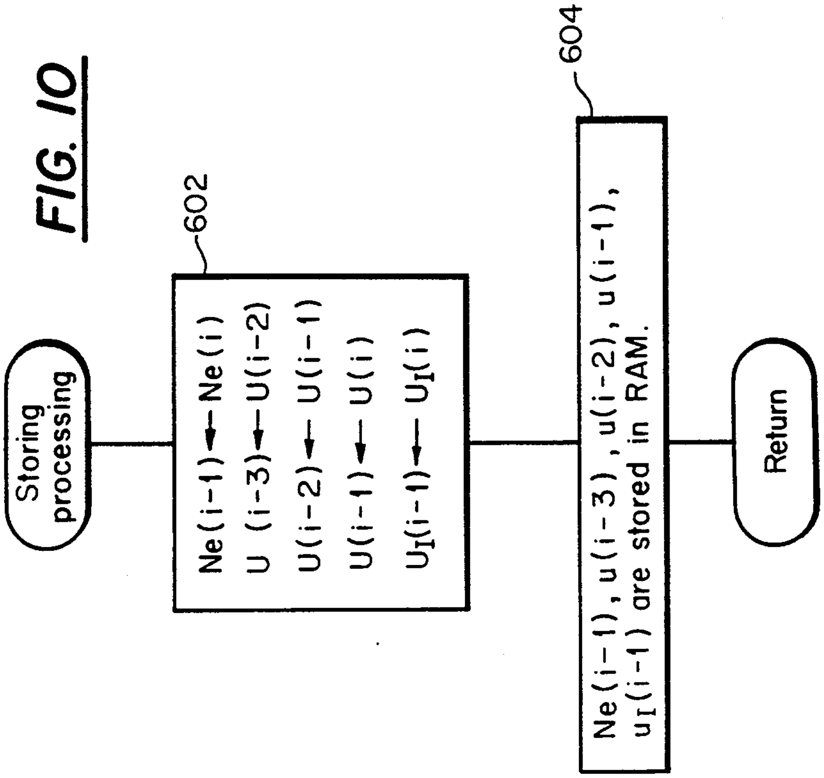
Figure 11:
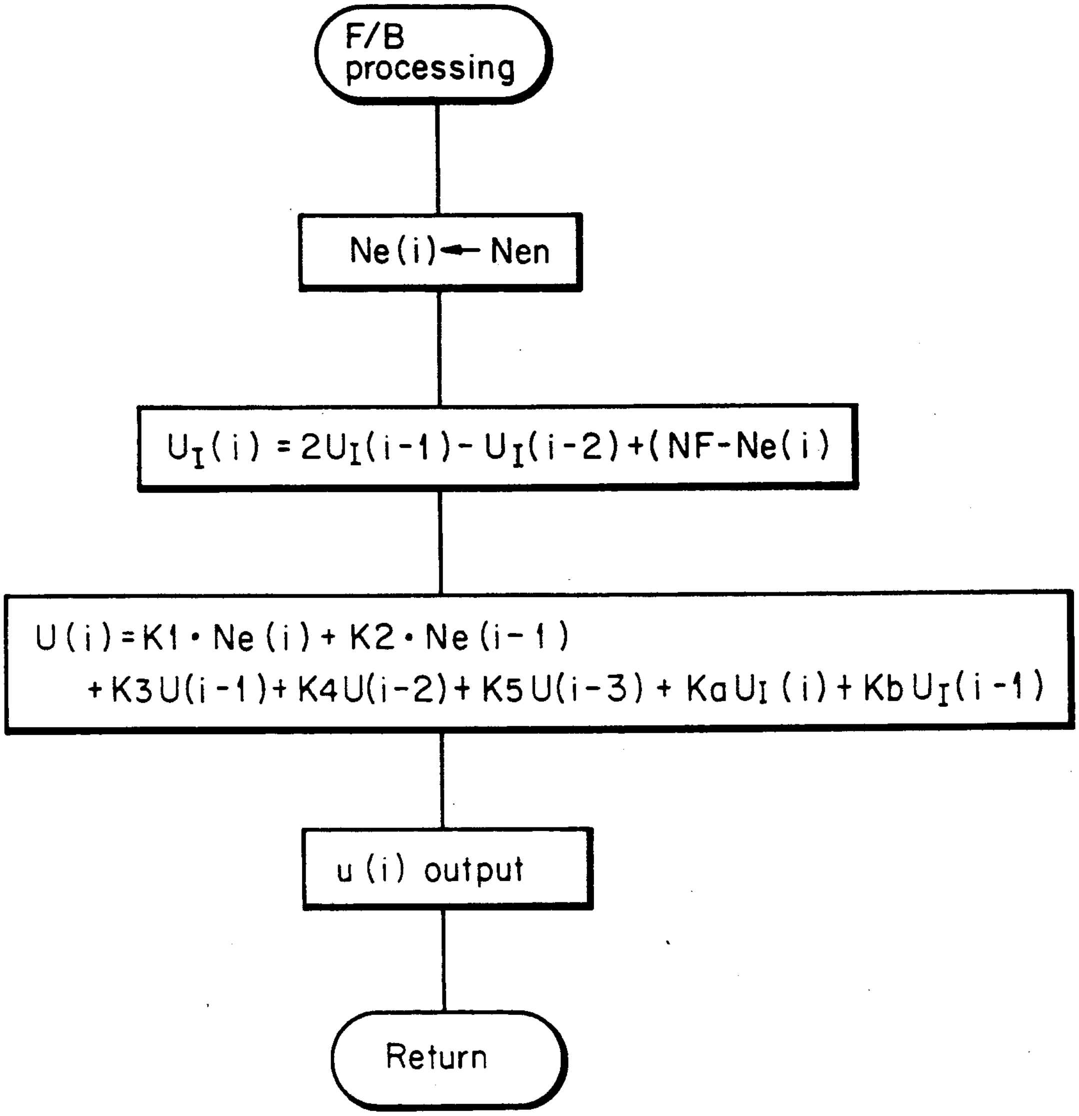
FIG. 11 and FIG. 13 are flow charts of an ISC valve control program in the case where two integrators are
Figure 12:
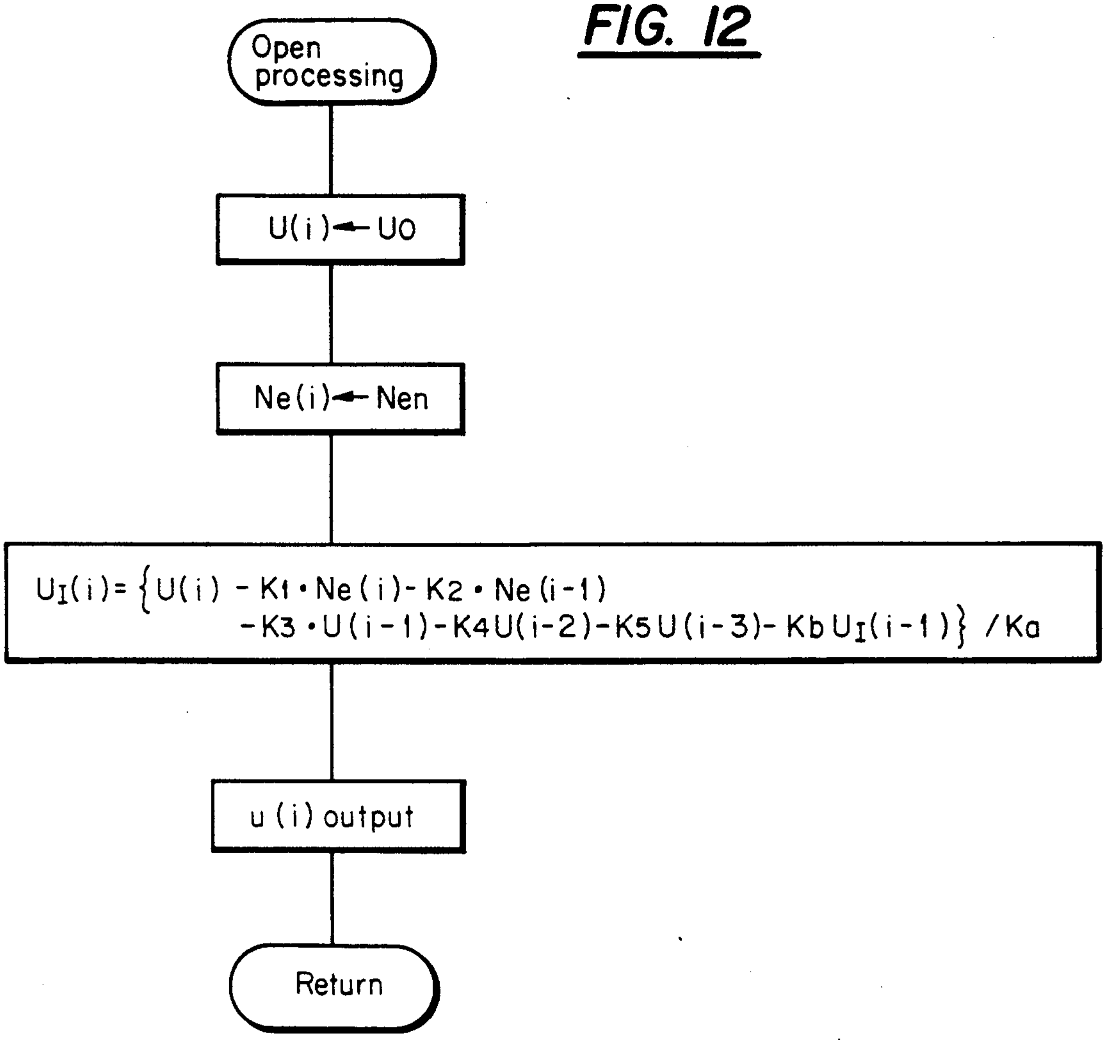
Figure 13:
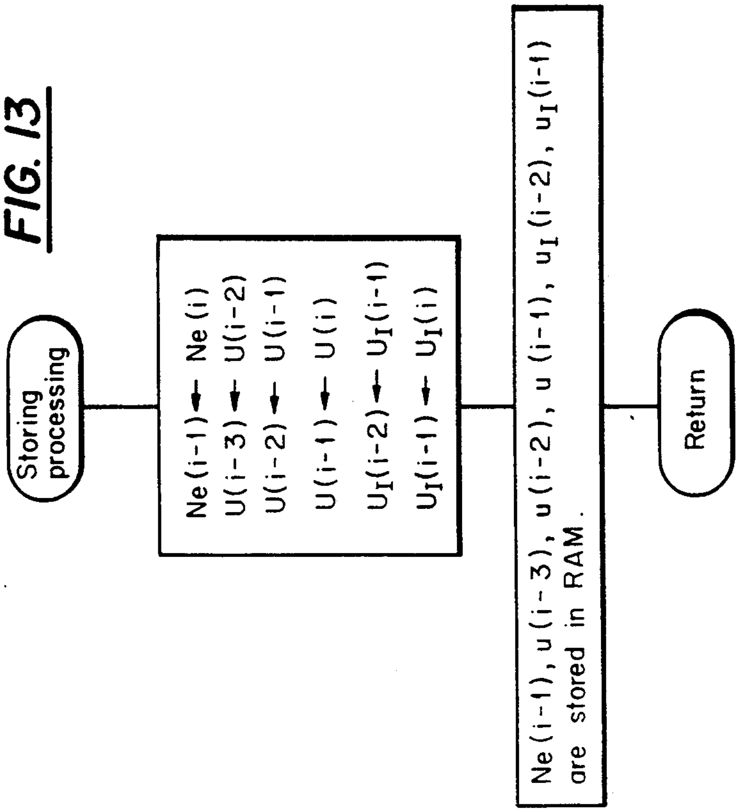

In FIGS. 8, 9 and 10, a case is explained in which the disturbance and target rotating speed are constant or changed stepwise (equations (8) and (9)). Flow charts in the case in which the disturbance and target rotating speed are changed rampwise (equations (8)′ and (9)′), are shown in FIGS. 11, 12, and 13.

In the manner described above, when the target rotating speed is the same as the previous time or changes stepwise, the calculation is conducted by one integrator, when the target rotating speed changes rampwise, two integrators are used for calculation so that the deviation from the target rotating speed can be removed.

In the storing processing in step 334 in the processing shown in FIG. 7, the state variable and integral term are stored in the form corresponding to the next processing. However the following method may be adopted: the state variable and integral term are stored in the forms which have been used in the calculation processing of step 320 and 332; and when the next processing is conducted in steps 320 and 332, the state variable is changed to a value corresponding to the calculation of the next processing.

Figure 14:
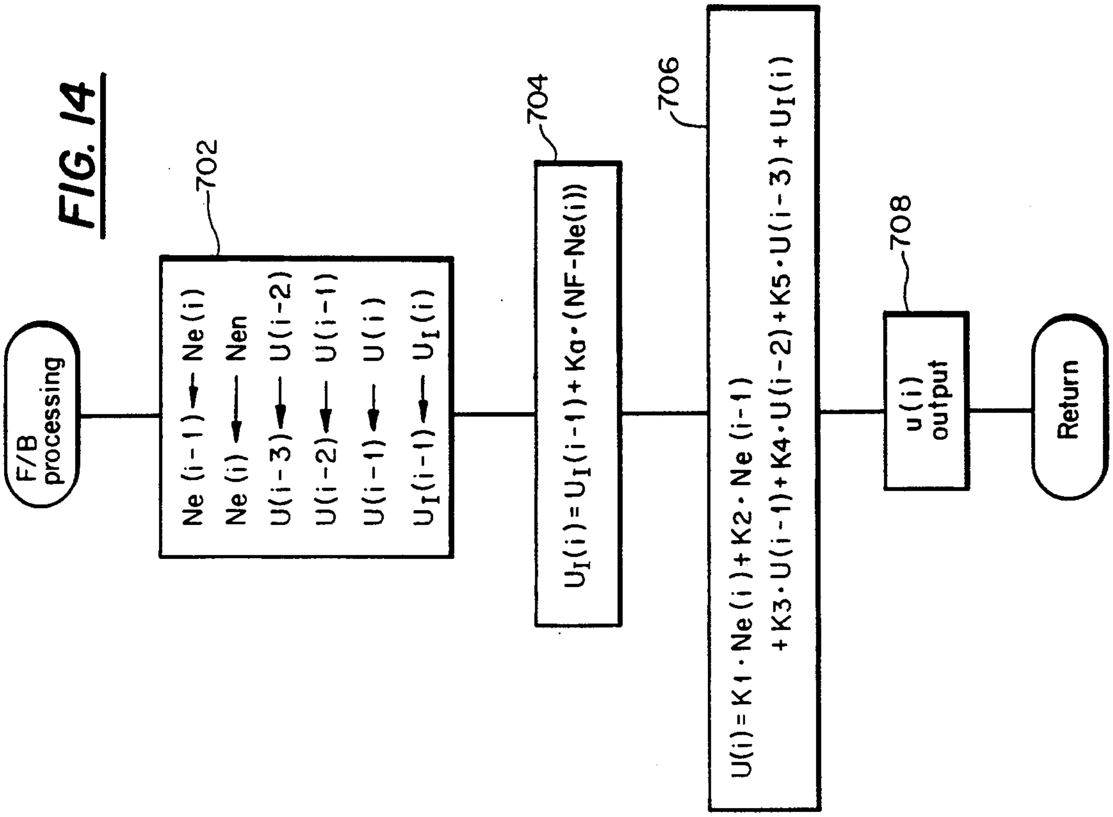
Figure 15:
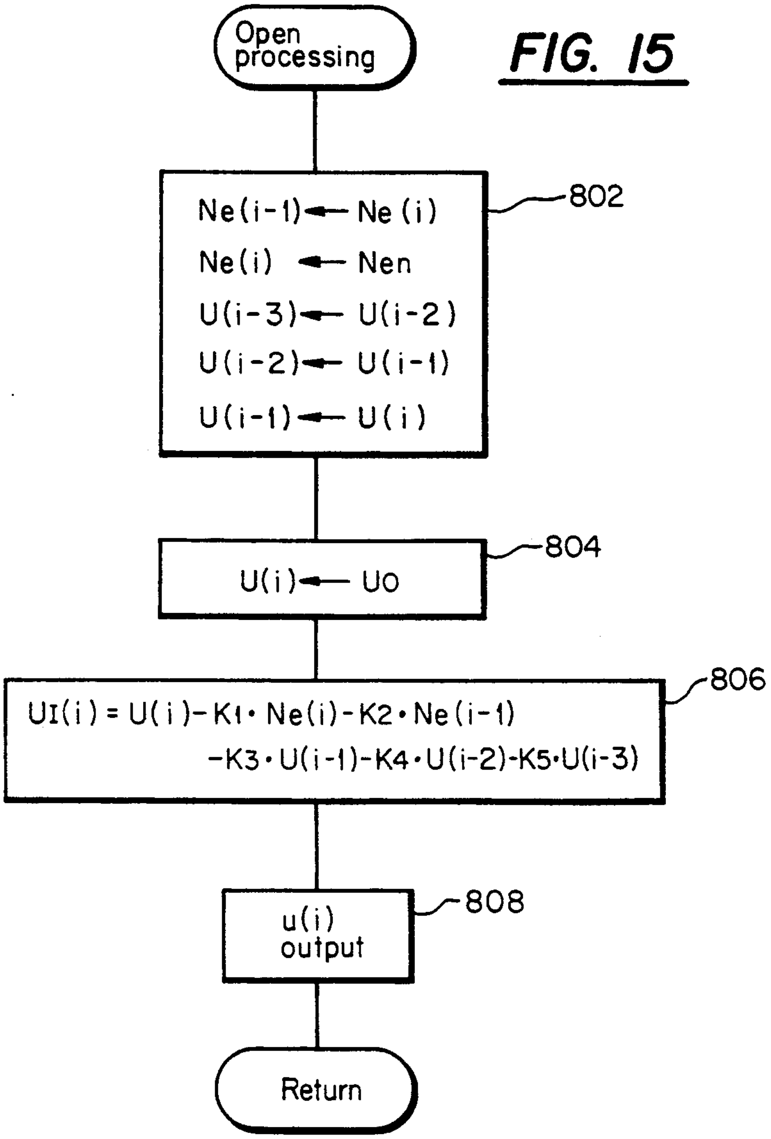
Figure 16:
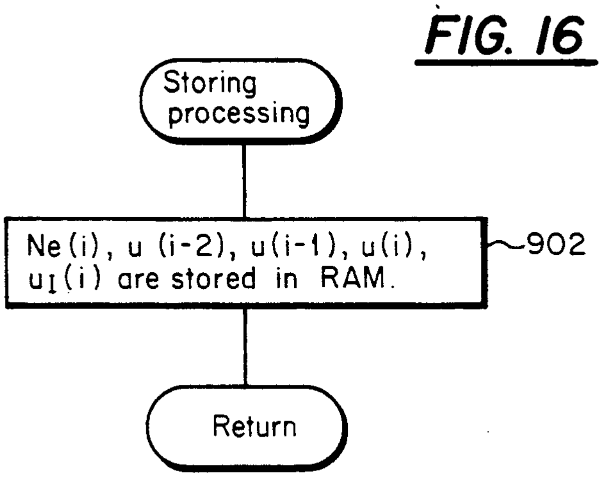

Specifically, as shown in FIG. 14, FIG. 15 and FIG. 16, the F/B processing is conducted as follows: the previous state variables Ne(i), u(i−2), u(i−1), u(i) which are stored in step 702, are respectively substituted into Ne(i−1), u(i−3), u(i−2), u(i−1); the previous integral term $u_I(i)$ is substituted into uI(i−1); and further the latest rotating speed Nen is substituted into Ne(i). In the manner described above, the present state variable [Ne(i) Ne(i−1) u(i−1) u(i−2) u(i−3)] can be set. In steps 704, 706, 708, the same processing as that of steps 404, 406, 408 is conducted.

The open processing is conducted as follows: the previous state variables Ne(i), u(i−2), u(i−1), u(i) which are stored in step 802, are respectively substituted into Ne(i−1), u(i−3), u(i−2), u(i−1); and the latest rotating speed Nen is substituted into Ne(i). In the manner described above, the present state variable [Ne(i) Ne(i−1) u(i−1) u(i−2) u(i−3)] can be set. The same processing as that in steps 502, 506, 508 in FIG. 9 is conducted in steps 804, 806, 808.

In the storing processing, the state variables Ne(i), u(i−2), u(i−1), u(i) and $u_I(i)$ which are obtained by the processing in step 902 shown in FIG. 14 and FIG. 15, are stored in RAM 53 in order to prepare for the next processing.

Figure 17:
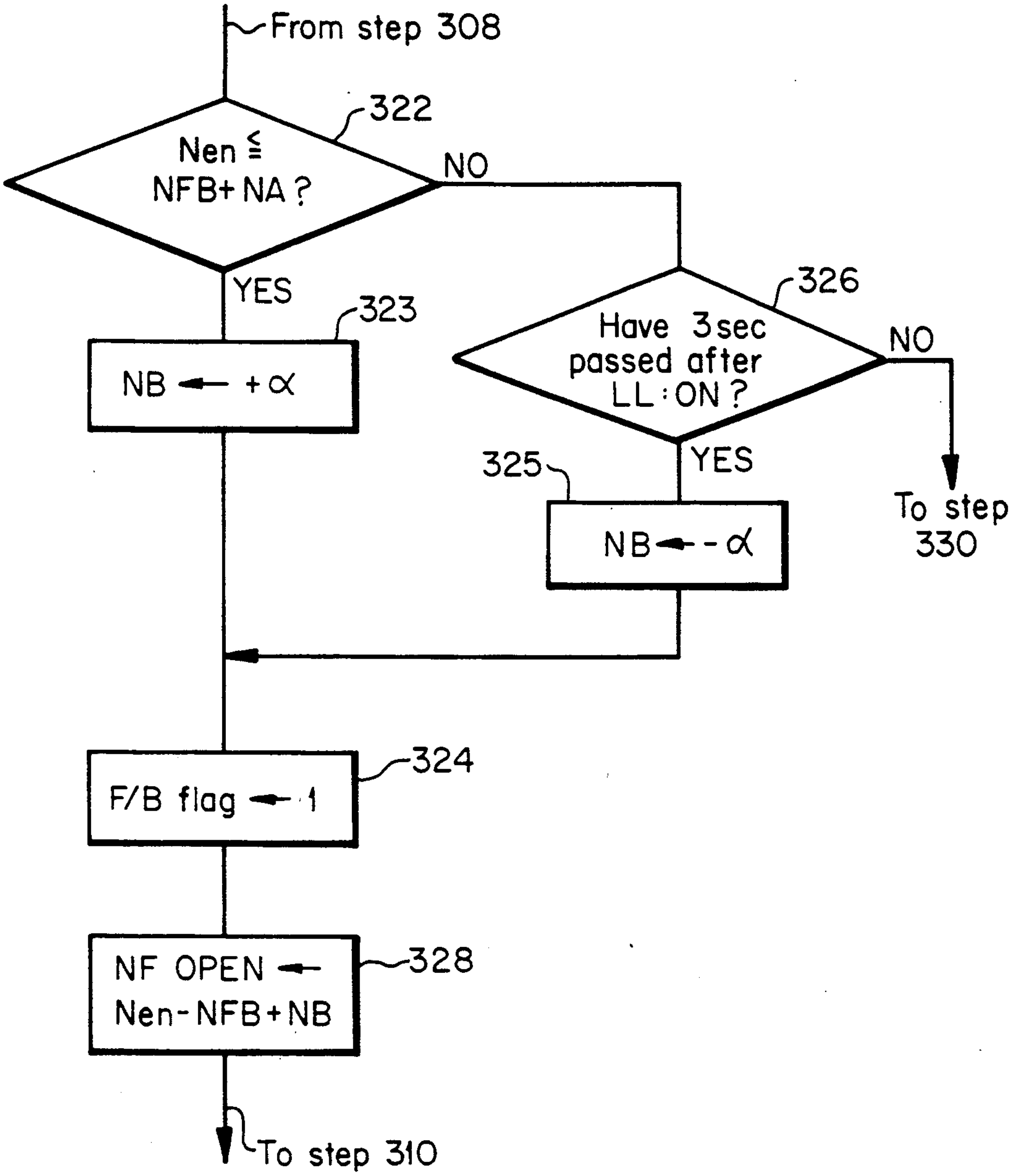

In the aforementioned processing in FIG. 7, the rotating speed at the time when it is judged that the F/B processing is started, is used for the initial value of the target rotating speed in the F/B processing when the state has been changed from an open state to an F/B state. However, the value obtained by adding a predetermied value to the rotating speed at the time when it is judged that the F/B processing is started, or the value obtained by subtracting, may be used for the initial value. Specifically, as illustrated in FIG. 17, when it is judged in step 322 that Nen≦NFB+NA and the process advances to step 323, $+\alpha$ (for example, +50 rpm) is added to the correction value NB, and the process advances to step 324. When the process advances to step 325 under the condition that LL:ON, not under the condition that Nen≦NFB+NA, $-\alpha$ is set to the correction value NB, and then the process advances to step 324. After 1 has been set to the F/B flag has been set to 1 in step 324, the calculation result of Nen−NFB+NB is substituted into the raise NFOPEN in step 328, and then the process advances to step 310. According to the processing of FIG. 17, when the F/B is started due to a sharp decrease in the rotating speed, for example, after racing, the correction value NB is added so that the raise NFOPEN can be increased. Consequently, the target rotating speed NF at the time of F/B start, is set higher than the actual rotating speed at the time when it is judged that the F/B starts, by the correction value NB, so that this case is superior to the aforementioned embodiment in terms of restricting the slowdown speed.

Although the actual speed is maintained high, the initial value of the target rotating speed NF is made small in such a manner that the raise NFOPEN is made small by the correction value NB, when F/B processing starts after 3 seconds have passed after LL:ON. Accordingly, the rotating speed of this case converges to the reference rotating speed NFB of a usual idling operation more quickly than the aforementioned embodiment.

In the aforementioned embodiment, the apparatus is explained in which the state variables are constructed, using the input and output data obtained in the past. An embodiment will be explained in which the state variables are estimated by observation apparatuses which are shown in the official gazettes of Japanese Patent Application Laid Open Nos. 145339-1984 and 7753-1984. The control program of ISC valve 44 is essentially the same as that in FIG. 7 described above, and only steps 320, 332, 334 are different, so that the portions corresponding to the steps will be explained referring to FIG. 18–FIG. 20. Since the essential technique has been disclosed in the above-described official gazettes, the explanation will be omitted here.

Figure 18:
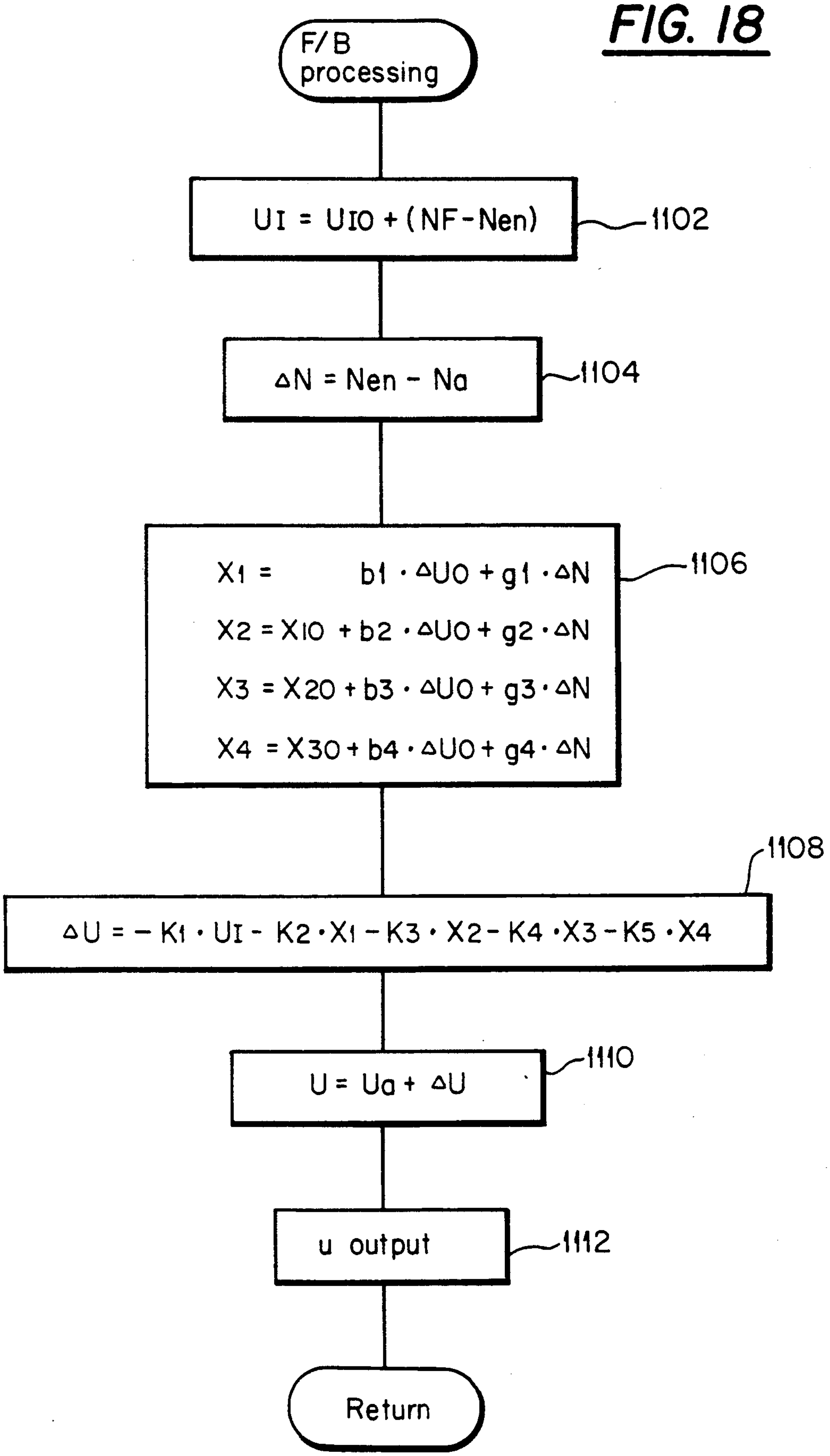

In the F/B processing illustrated in FIG. 18, in step 1102, the deviation between the target rotating speed NF and the actual rotating speed Nen is added to the integral term $u_{I0}$ which has been stored in the previous calculation timing so that the present integral term $u_I$ can be calculated. In step 1104, the slip ΔN of the actual rotating speed Nen from the reference setting value Na (for example, 650 rpm) is calculated. In step 1106, the state variables $X_{10}$, $X_{20}$, $X_{30}$ which are stored at the previous calculation timing, the increment $\Delta u_0$ of the control value u with regard to the reference setting value ua, and the slip ΔN which are found in step 1104, are weighted by the most optimum gains ($b_1$, $b_2$, $b_3$, $b_4$) and ($q_1$, $q_2$, $q_3$, $q_4$) and the present state variables $X_1$, $X_2$, $X_3$, $X_4$ are found.

In step 1108, the present uI which is found in step 1102, and the present state variables $X_1$, $X_2$, $X_3$, $X_4$ found in step 1106 are multiplied by the most optimum gains $K_1$, $K_2$, $K_3$, $K_4$, $K_5$ so that the present increment Δu is found. In step 1110, the present control value u is determined from the reference setting value ua and the increment Δu. In step 1112, according to the determined present control value u, the control signal of the duty ratio is outputted from the output port 58 to ISC valve 44.

Figure 19:
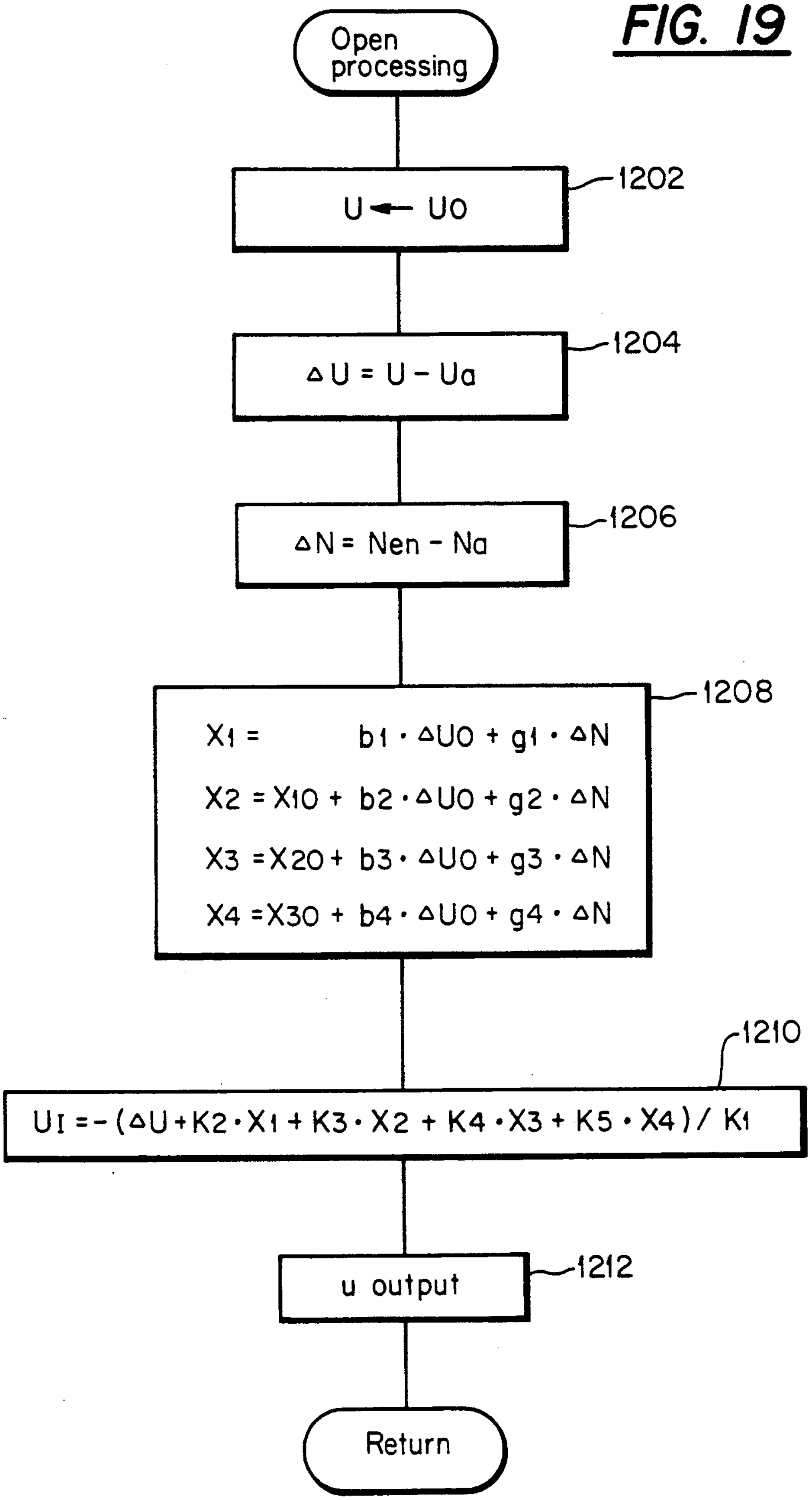

Next, in the open processing illustrated in FIG. 19, in step 1202, the present control value u is set to a predetermined value $u_0$. This predetermined value $u_0$ is the same as that in step 502 in the aforementioned embodiment. In step 1204, the present increment Δu is found from the control value u which is set in step 1202 and the reference setting value ua. In step 1206, the slip ΔN of the actual rotating speed Nen from the reference setting value Na is calculated. In step 1208, in the same manner as the aforementioned embodiment, in order to prepare the next F/B processing, the state variables $X_1$, $X_2$, $X_3$, $X_4$ in an open condition are found by the same processing as that in step 1106 shown in FIG. 18. In step 1210, in the same manner as the aforementioned embodiment, $u_I$ corresponding to the state is reversely calculated according to the present increment Δu found in steps 1204, 1208 and the state variables $X_1$, $X_2$, $X_3$, $X_4$. In step 1212, a control signal of the duty ratio according to the control value u which is set in step 1202, is outputted to ISC valve 44 from the output port 58.

Figure 20:
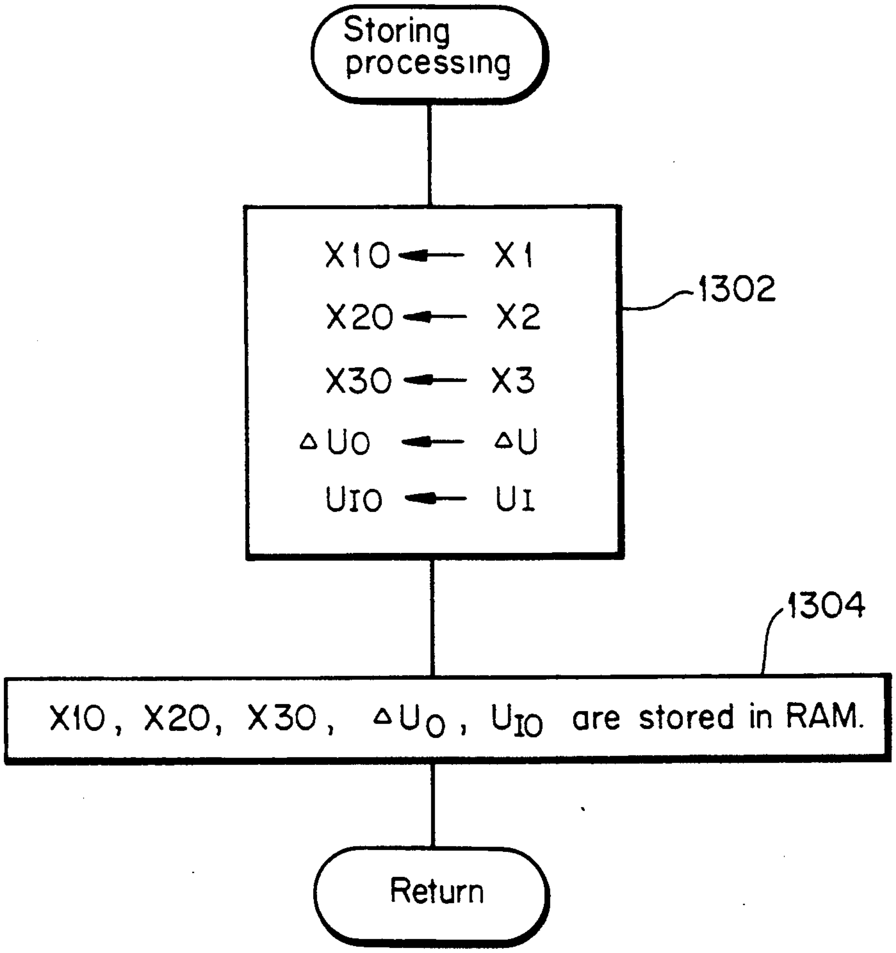

Next, in the storing processing illustrated in FIG. 20, in step 1302, the values of X1, X2, X3, Δu and $u_I$ of the present calulation timing which are determined when either the aforementioned F/B processing or the open processing is carried out in order to prepare for the next F/B processing, are defined as $X_{10}$, $X_{20}$, $X_{30}$, $\Delta u_0$ and $u_{I0}$, and in step 1304, these $X_{10}$, $X_{20}$, $X_{30}$, $\Delta u_0$ and $u_{I0}$ are stored in RAM 53.

In this embodiment, in an open state, the state variables $X_1$, $X_2$, $X_3$, and $X_4$ are also found corresponding to the state at the point of time, and the integral term $u_I$ is reversely calculated from the found state variables and the increment Δu relating to the determined control value u. The previous state variables $X_{10}$, $X_{20}$, $X_{30}$ which are stored at present for the next F/B processing, are replaced with the state variables $X_1$, $X_2$, $X_3$ which have been found in the open state, in other words, the previous state variables are renewed and stored. Concerning $u_I$, instead of $u_{I0}$ which is stored at the previous calculating timing, $u_I$ which has been found by a reverse calculation is stored. In the aforementioned embodiment, the completion of a warming-up operation is set as a condition of F/B. However, this condition may be eliminated, and the F/B processing may be conducted from the time in which a warming-up operation is being conducted. However, it is preferable that a mechanical air valve is installed in parallel with ISC valve 44 in order to supply air during the warming-up operation.

Referring to a flow chart shown in FIG. 21, the second embodiment will be explained which is suited for restricting the control value (the duty ratio) of ISC valve 44 to 20%–80%, giving consideration to the adjustable range and linearity of ISC valve 44. The flow chart shown in FIG. 21 can be obtained in such a manner that the processing of steps 410–413 is inserted into steps 404–406 in FIG. 8, and that the processing of steps of 414–416 is inserted into steps 406–408.

First, in step 402, the latest rotating speed Nen is substituted into Ne(i), and the calculation of the aforementioned equation (9) is carried out in step 404 so that $u_I(i)$ is found. In step 410, it is judged whether $u_I(i)$ found in step 404 is larger than the value obtained by adding a predetermined value α to $u_I(i-1)$ determined at the previous calculation timing.

In step 411, it is judged whether the integral term $u_I(i)$ found in step 404 is smaller than the value obtained by subtracting a predetermined value β from $u_I(i-1)$ determined at the previous timing, or not. When it is judged in step 410 that $u_I(i) > u_I(i-1)+\alpha$, $u_I(i-1)+\alpha$ is substituted into $u_I(i)$ in step 412. When it is judged in step 411 that $u_I(i) < u_I(i-1)-\beta$, the value of $u_I(i-1)-\beta$ is substituted into $u_I(i)$ in step 413. That is, the present $u_I(i)$ is maintained to be in the predetermined range in accordance with the previous $u_I(i-1)$.In the next step 406, the present control value u(i) is calculated according to the equation (8). The values of Ne(i−1), u(i−1), u(i−2) and u(i−3) which are used to calculate the present control value u(i), are stored by the storing processing of step 334 in FIG. 7, preparing for the feed back processing. The present state variable $X = [Ne(i)\ Ne(i-1)\ u(i-1)\ u(i-2)\ u(i-3)]^T$ can be set by these Ne(i−1), u(i−1), u(i−2) and u(i−3), and Ne(i) which has been found in the present processing. That is, in step 406, the present control value u(i) is determined in such a manner that: the present state variable X which has been set in the aforementioned manner, and the most optimum gain $|K = [K_1\ K_2\ K_3\ K_4\ K_5]$ which has been determined previously, are calculated by means of the matrix calculation; and further the present $u_I(i)$ is added.

In step 414, it is judged whether the present control value u(i) calculated in step 406 is in the predetermined upper and lower limit (20–80%). In step 415, when the present control value u(i) exceeds the upper limit (80%), the present control value u(i) is set to 80%, and when the present control value u(i) is smaller than the lower limit (20%), the present control value u(i) is set to 20%.

After the restriction has been conducted on the present control value u(i) in step 415, the process advances to step 416. In step 416, $u_I(i)$ is reversely calculated so that the restricted control value u(i) and the state variable can be satisfied by the equation (8) corresponding to the restriction of the control value u(i). In step 408, the control signal of the duty ratio according to the present control value u(i) which has been set in step 406 or step 415, is outputted from the output port 58 to ISC valve 44.

Figure 21:
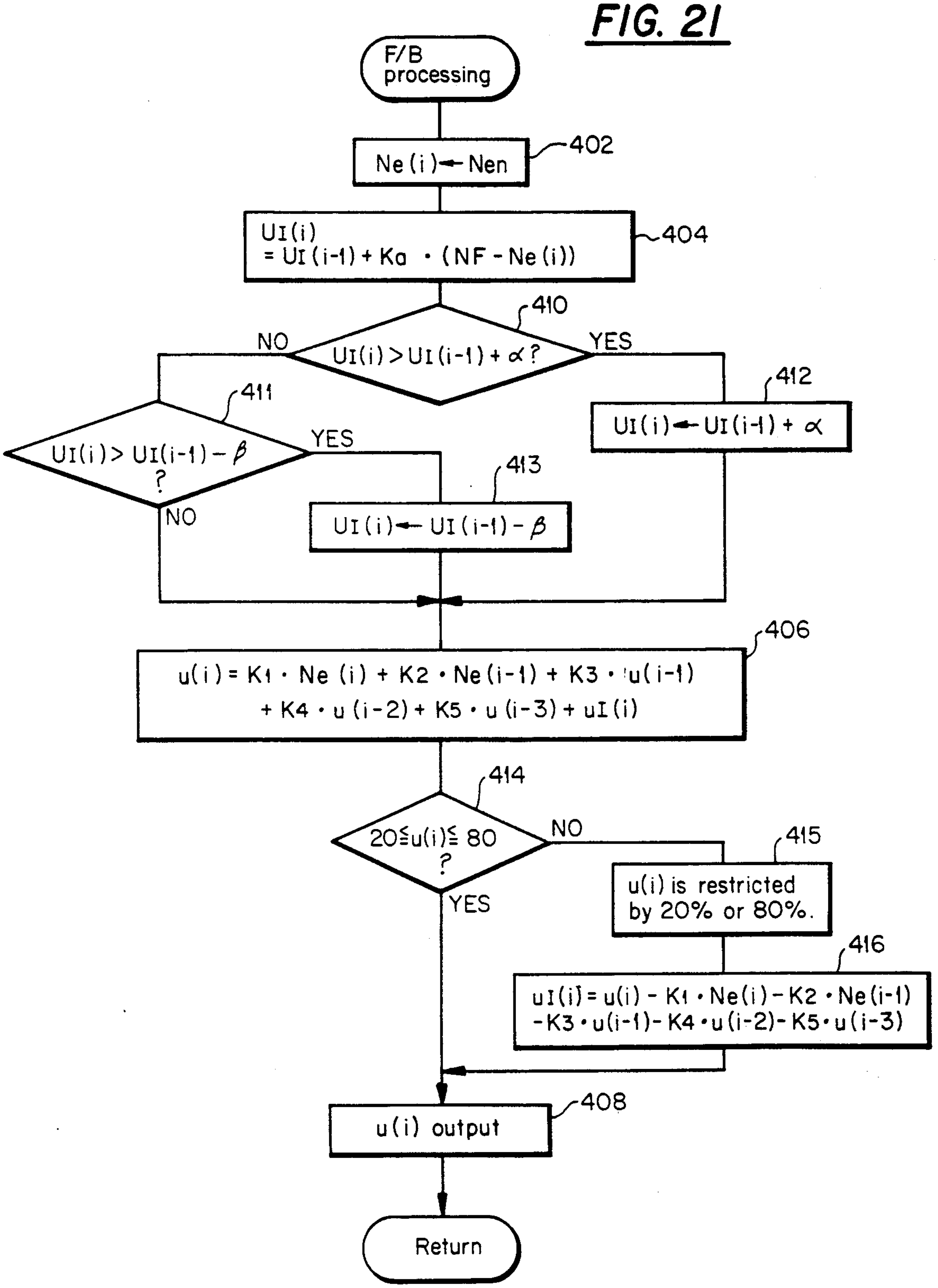

Consequently, according to the control of ISC valve 44 shown in FIG. 21, the final control value u(i) is controlled into the predetermined range of the upper and lower limit in the feed back processing. While the control value u(i) is restricted, $u_I(i)$ is reversely calculated so that the restricted control value u(i) and the state variable can be satisfied by equation (8).

Accordingly, the control value u(i) can be varied in the direction opposite to the restriction sensitively to the engine state, so that the valve 44 can be operated in a quick response. That is, the problem of response delay described in the aforementioned prior art can be sufficiently solved.

The initial value $u_I(i)$ immediately after the state has been changed from the state in which the control value is restricted, into the state in which the control value is not restricted, is determined corresponding to the state variable of an engine just before its state is changed. Consequently, the value of $u_I$ can be smoothly changed when the state is changed in the aforementioned manner, so that the variation in rotating speed can be restricted when the state is changed.

Figure 22:
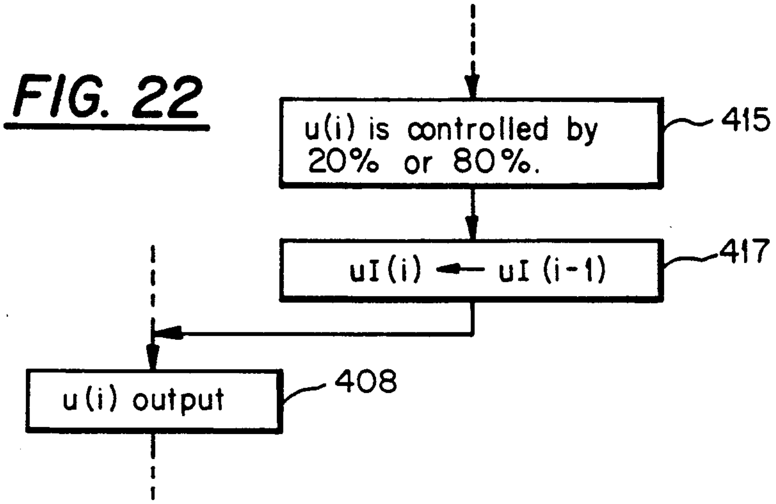

In the embodiment shown in FIG. 21, while the present control value u(i) is restricted in step 415, the value of $u_I(i)$ is reversely calculated in step 416. However, while the present control value u(i) is restricted in step 415 as shown in FIG. 22, the present $u_I(i)$ may be held to be $u_I(i-1)$ Of the previous calculation timing.

Figure 23:
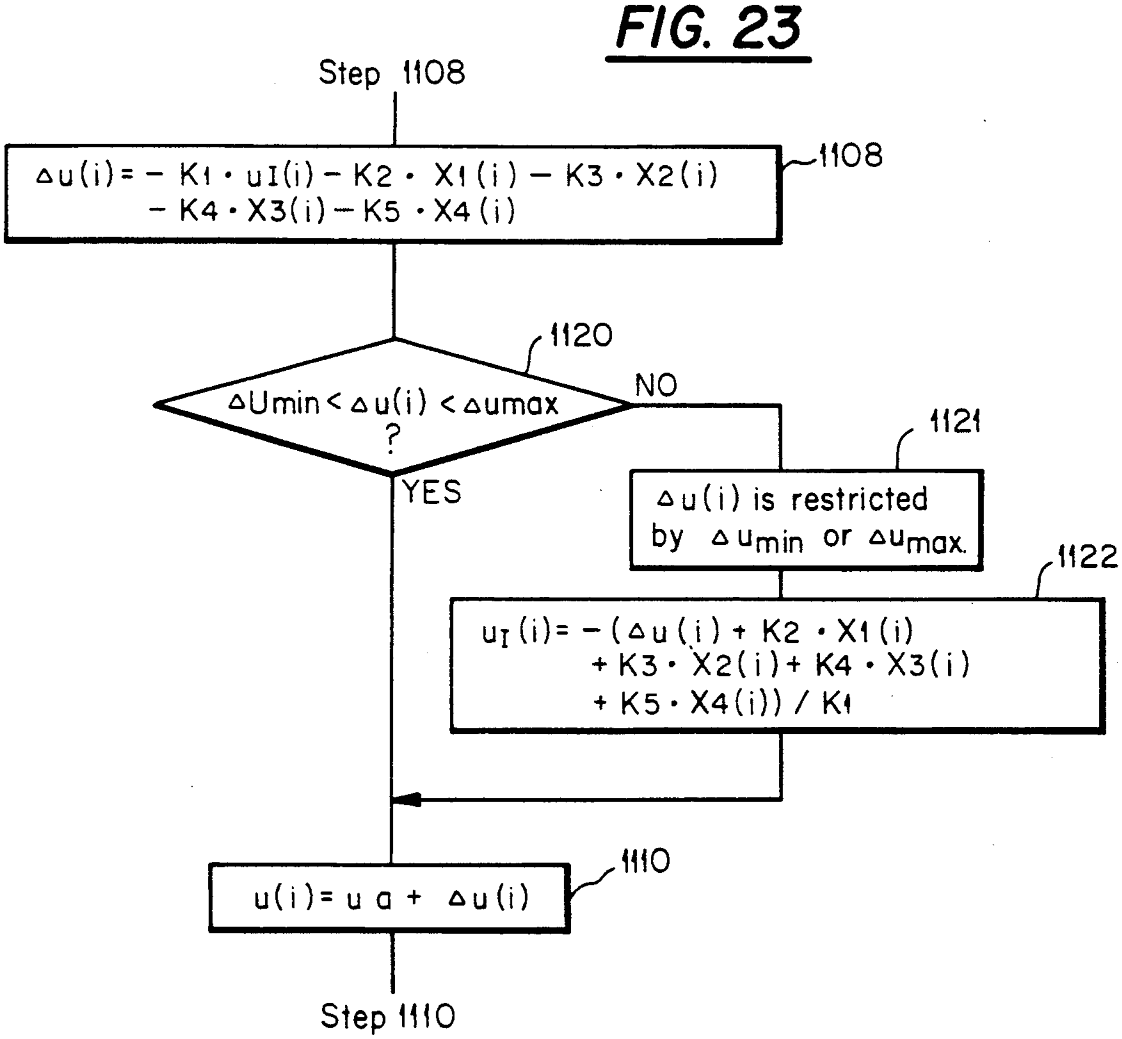

Referring now to a flow chart shown in FIG. 23, the embodiment shown in FIG. 18 will be explained in the case where the present control value u(i) is restricted in the manner described above. The flow chart shown in FIG. 23 is composed in such a manner that: steps 1120-1122 are inserted between step 1108 and step 1110 in the flow chart of FIG. 18.

In step 1120, it is judged whether the present increment Δu(i) calculated in the manner described above in step 1108 is within a predetermined upper and lower limit ($\Delta u_{min}-\Delta u_{max}$) or not. In step 1121, when the present increment Δu(i) is out of the range and exceeds the upper limit $\Delta u_{max}$, the present increment Δu(i) is set to the upper limit $\Delta u_{max}$. When the present increment Δu(i) is smaller than the lower limit $\Delta u_{min}$, the present increment Δu(i) is set to the lower limit $\Delta u_{min}$. In step 1122, $u_I(i)$ is reversely calculated according to the following equation.

$$u_I(i) = -(\Delta u(i) + K_2 \cdot X_1(i) + K_3 \cdot X_2(i) + K_4 \cdot X_3(i) + K_5 \cdot X_4(i))/K_1$$

In step 1110, the present control value u is determined according to the present increment Δu(i) which has been set in step 1108 or step 1121, and according to the reference setting value ua.

Next, an embodiment will be explained in which the present invention is applied to an idling speed control unit in which a step motor type of control valve is utilized for an air control valve.

Referring to a flow chart shown in FIG. 24, the processing carried out in CPU 51 of the electronic control unit 20 will be explained.

Figure 24:
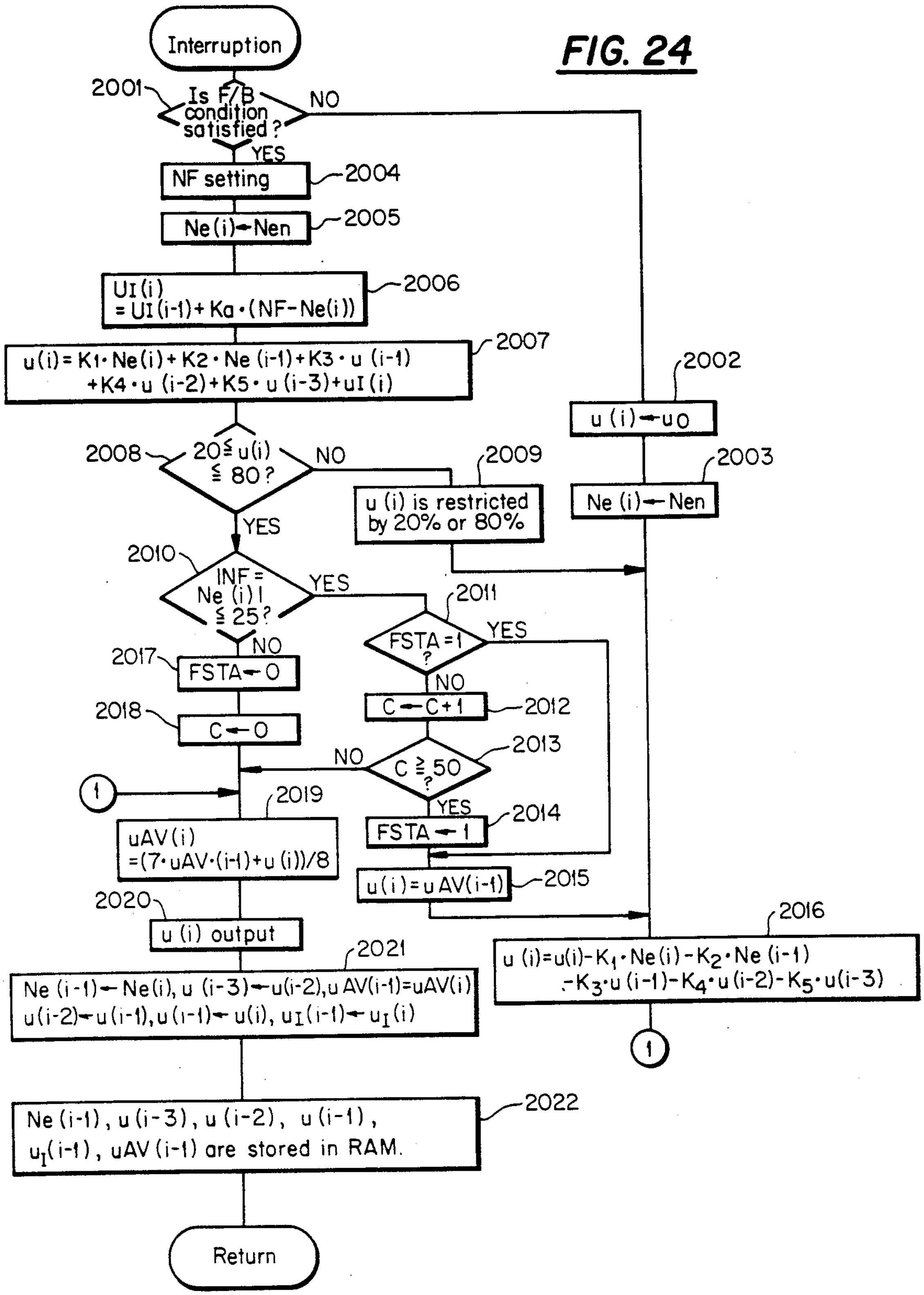

The flow chart of FIG. 24 is a control program of a step type of control valve. In the same manner as the aforementioned embodiment of an ISC valve, when the processing is started at each predetermined period of time (for example, each 100 msec), it is judged in step 2001 whether the operating condition of the engine 10 agrees with the condition to carry out the feed back control of idling speed. As shown in a flow chart in FIG. 7, the feed back conditions are as follows: a predetermined period of time (for example, 3 seconds) has passed after the start of the engine; the throttle valve 31 is completely closed; and a warming-up operation has been completed. When all the conditions are satisfied, the process advances to step 2004, and feed back control is conducted so that the engine speed can become the target speed.

On the other hand, when it is judged in step 2001 that the feed back conditions are not satisfied, the open processing after step 2002 is conducted.

In this open processing, the present control value u(i) is set to a predetermined value $u_0$ in step 2002. This predetermined value $u_0$ may be an arbitrary constant value such as 100% and 50% as a duty ratio, or it may be a value which can be determined according to a detection parameter such as cooling water temperature Thw.

Next, detected rotating speed Nen is substituted into Ne(i) in step 2003, and then the process advances to step 2016.

In step 2004, the target rotating speed NF is determined according to cooling water temperature Thw, intake temperature Tam, the ON-OFF state of an air-conditioner, and the range position of an automatic transmission.

In step 2005, the latest detected rotating speed Nen is substituted into Ne. In step 2006, the integral value $u_I(i)$ is renewed according to equation (9) on the basis of the deviation between the aforementioned target rotating speed determined in step 2004 and Ne(i) determined in step 2004.

In the next step 2007, the present control value u(i) is calculated according to the equation (8). The values of Ne(i−1), u(i−1), u(i−2) and u(i−3) which are used to calculate the present control value u(i), are stored in step 2022, preparing for the feed back processing. The present state variable $X=[Ne(i)\ Ne(i-1)\ u(i-1)\ u(i-2)\ u(i-3)]^T$ can be set by these Ne(i−1), u(i−1), u(i−2) and u(i−3), and Ne(i) which has been found in the present processing.

That is, in step 2007, the present control value u(i) is determined in such a manner that: the present state variable X which has been set in the aforementioned way and the most optimum gain $|K=[K_1\ K_2\ K_3\ K_4\ K_5]$ which has been determined previously are calculated by means of the matrix calculation; and further the present $u_I(i)$ is added.

In step 2008, it is judged whether the present control value u(i) calculated in step 2007 is in the predetermined upper and lower limit (20−80%). In step 2009, when the present control value u(i) exceeds the upper limit (80%), the present control value u(i) is set to 80%, and when the present control value u(i) is smaller than the lower limit (20%), the present control value u(i) is set to 20%.

After the restriction has been conducted on the present control value u(i) in step 2009, the process advances to step 2016.

On the other hand, when the present control value u(i) is in the range of the aforementioned upper and lower limit, the process advances to step 2010. In step 2010, it is judged whether the absolute value of the deviation of the detected rotating speed Ne(i) from the target rotating speed NF is not more than a predetermined value (for example, 25 rpm in this embodiment), or not. When the absolute value of the deviation is not more than the predetermined value, it is judged in step 2011 whether flag FSTA is set (FSTA=1) or not. Flag FSTA is set when the rotating speed is close to the target rotating speed in a steady condition. When flag FSTA is set in step 2011, in other words, when the rotating speed is in a steady condition, the process advances to step 2015.

When flag FSTA is not set in step 2011, counter C is counted up in step 2012 (C←C+1). Counter C is used to measure the time which has passed from when the absolute value of the aforementioned deviation became not more than the predetermined value. In step 2013, it is judged whether the value counted by counter C is not less than a predetermined value (for example, in this embodiment, 50) or not, that is, whether a predetermined period of time (for example, in this embodiment, 5 seconds) has passed or not after the absolute value of the aforementioned deviation became not more than a predetermined value. When the predetermined period of time has not passed yet, the process advances to step 2019.

On the other hand, when the predetermined period of time has passed, it can be judged that the rotation is in a steady state, and flag FSTA is set in step 2104 (FSTA→1) and the process advances to step 2015.

When the rotation is in a steady state, the present control value u(i) is set to a steady state control value uAV(i−1), and the process advances to step 2016. In step 2016, $u_I$(i) is reversely calculated according to the following equation so that the present control value u(i) and state variable X can satisfy equation (8), when the present control value u(i) is restricted in step 2009, when the present control control value u(i) is set to the predetermined value u(i) in an open processing in step 2002, and when the present control value u(i) is set to the steady condition control value uAV(i) in a steady condition in step 2015, that is, when the present control value u(i) is set to a value having no relation with state variable X.

$$u_I(i) \leftarrow u(i) - K_1 \cdot Ne(i) K_2 \cdot Ne(i-1) - K_3\ U(i-1) - K_4 \cdot U(i-2) - K_5 \cdot u(i-3)$$

Then, the process advances to step 2019. In step 2019, the present control value u(i) is processed by the following equation so that the steady state control value uAV(i) is calculated as follows, $$uAV(i) = \{7 \times uAV(i-1) + u(i)\}/8,$$

where uAV(i−1) is a steady state control value calculated at the previous control timing. In step 2020, the control signal of the duty ratio corresponding to the present control value u(i) which has been set in either step 2002, step 2007, step 2009 or step 2015, is outputted from the output port 58 to a step motor type of control valve.

In step 2021, Ne(i), u(i−2), u(i−1), u(i), $u_I$(i) and uAV(i) which have been set in the manner described above, are respectively substituted into Ne(i−1), u(i−3), u(i−2), u(i−1), $u_I$(i−1) and uAV(i).

In the following step 2022, Ne(i−1), u(i−3), u(i−2), u(i−1), uI(i−1) and uAV(i−1) which have been set in step 2021, are stored in RAM 53, and then the processing is completed.

In the above-described, step 2019, the steady state control value uAV(i) is set by processing the present control value u(i). However, the average of the control value u(i) may be used for the steady state control value uAV(i) as shown by the following equation.

$$uAV(i) = \{u(i) + u(i-1) + u(i-2) + u(i-3)\}/4$$

By the aforementioned processing, in a steady state (for example, in this embodiment, in a state when not less that 5 seconds have passed from when the deviation of the rotating speed from the target rotating speed NF became not more than 25 rpm), the present control value u(i) is set to the steady state control value uAV(i). In a steady state, this steady state control value uAV(i) is not renewed. Consequently, the variation of the operation of a step motor type of control valve can be inhibited, so that the durability can be improved.

While the present control value u(i) is set to the steady state control value uAV(i), the integral term $u_I$(i) is reversely calculated so that the present control value u(i) and state variable X can be satisfied by the equation (8). Consequently, the variation in rotation can be inhibited when the state is changed from a steady state to a non-steady state.

As described above, especially in FIG. 7, the state variable can be always set even in an open loop state. Therefore, even in the case where the state is changed from a state in which the present control value is set without any relation to the present state variable, into a state in which the present control value is set in accordance with the present state variable, the present state variable has been already set, so that the adjusting means can be operated in a quick response and the convergence to the target rotating speed can be improved.

In the case where a load, for example, such as a load given through D-range gear, is inputted, when the control value is corrected in the manner of feedforward, the rotating speed is held higher than the target rotating speed. The following is an embodiment which has been improved to solve the aforementioned problem.

In this embodiment, the control value (the duty ratio) with regard to ISC valve 44 is limited by the upper and lower limit of 0%−100% in accordance with the adjustable range of ISC valve 44. Further, state variables $X_1(i)-X_5(i)$ and the integral term $u_I$(i) are also limited by a predetermined upper and lower limit.

Furthermore, in this embodiment, feedforward control is also conducted in accordance with the state of load given to the engine 10 by the aforementioned air conditioner and transmission, and in accordance with the state of rotating speed Ne obtained from the rotating speed sensor 30. As described above, especially, in this embodiment, feedforward processing is carried out to the cases in which the upper and lower limit are respectively set to the control value, the state variable and the integral term.

Figure 25:
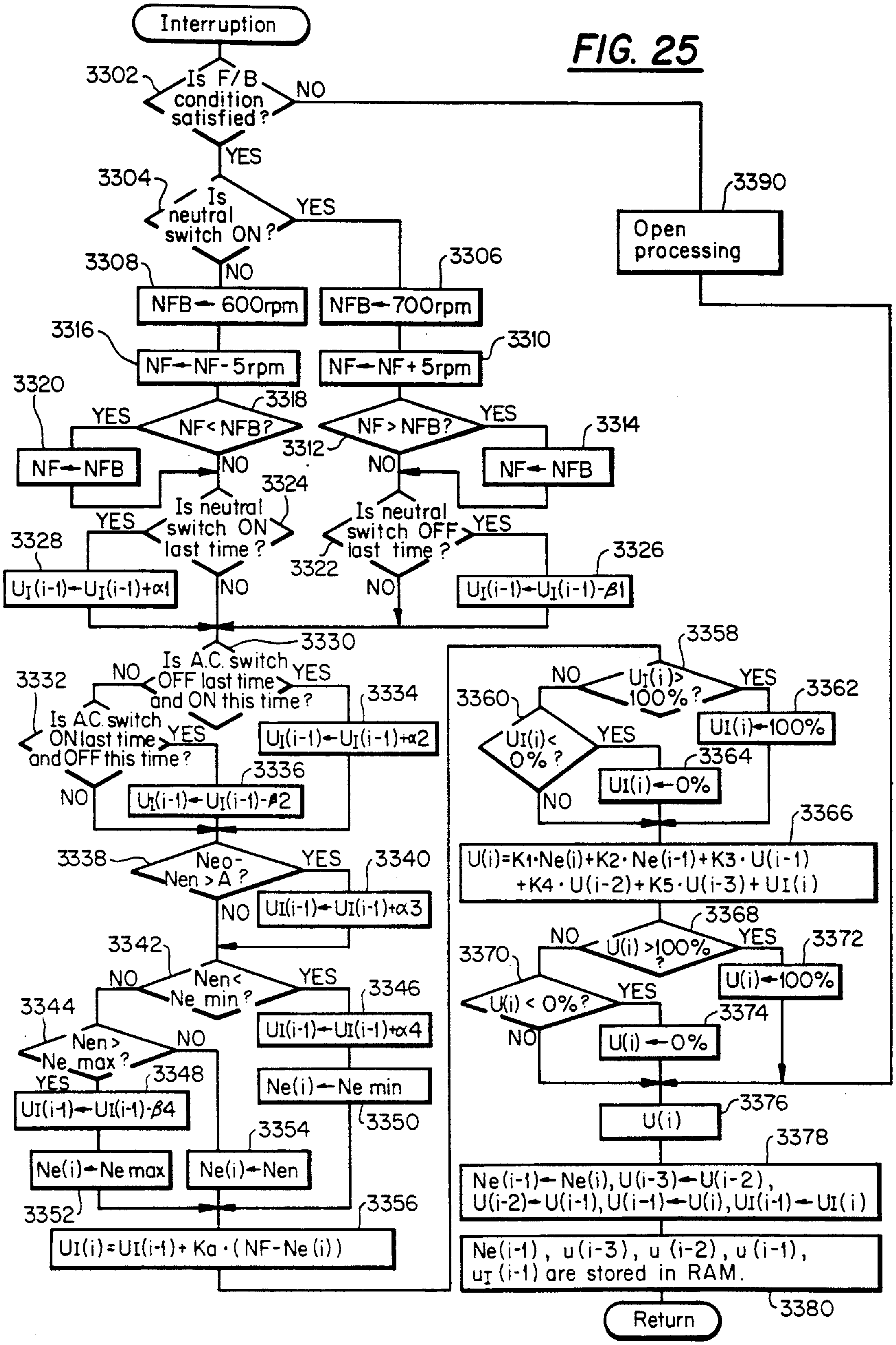
Figure 26:
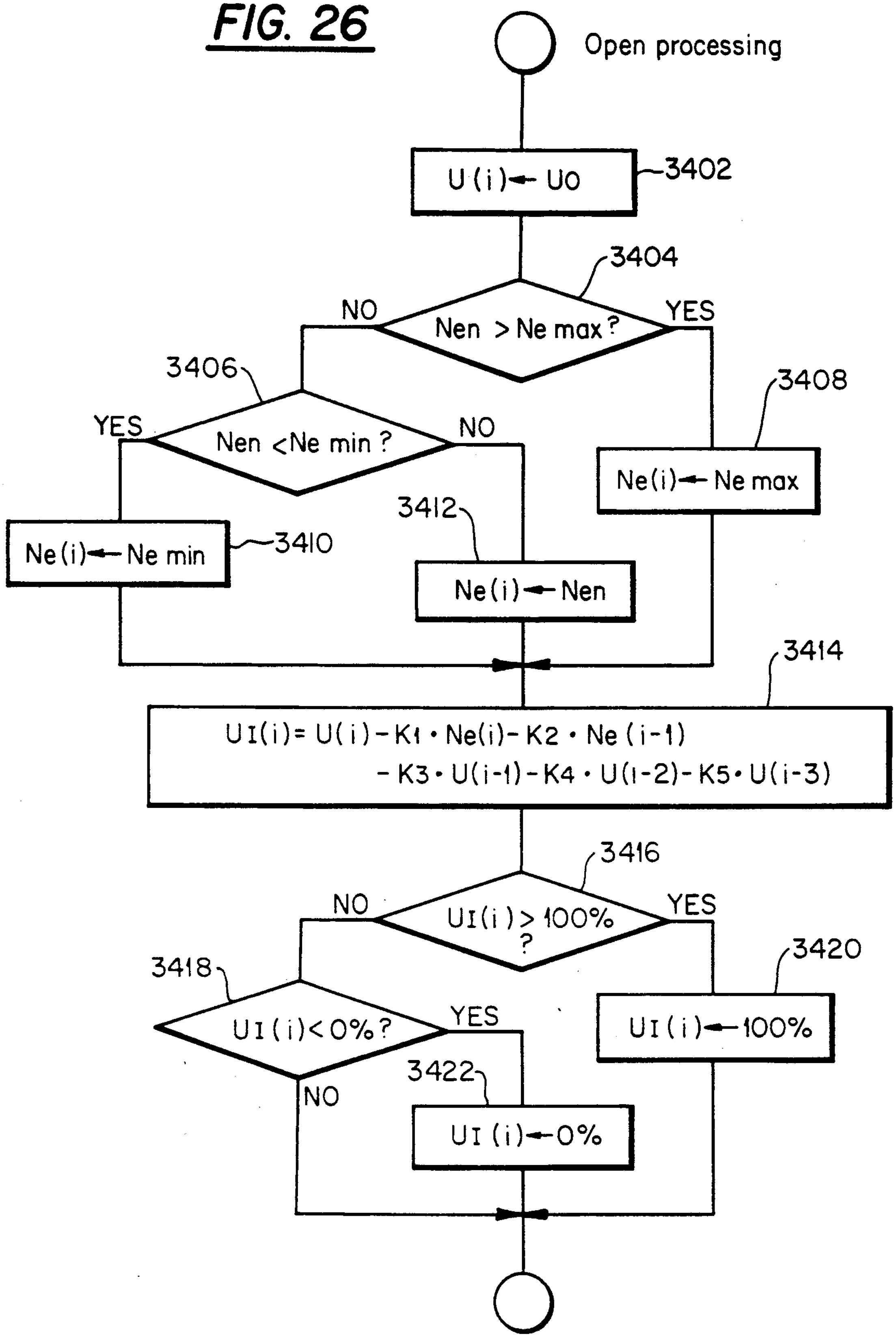

Referring now to FIG. 25 and FIG. 26, the processing carried out in CPU 51 of the electronic control unit 20 will be explained as follows.

A flow chart in FIG. 25 is a control program of ISC 44, and this control program is carried out at each predetermined time (for example, at each 100 msec) in the manner of interruption under the condition that an IG switch not shown in the drawing is closed.

When interruption processing is started, it is judged in step 3302 whether the operating condition of the engine 10 satisfies the conditions to carry out feedback control of the idling speed, or not. The feedback conditions are as follows: a predetermined period of time (for example, 3 sec) has passed after the start of the engine; the throttle valve 31 has been completely closed; and a warming-up operation has been finished. When all the conditions are satisfied, the process advances to step 3304.

In step 3304, it is judged whether a neutral switch 64 is turned on or not, that is, the automatic transmission is in the neutral range (the neutral range or parking range) or not. When the automatic transmission is in the neutral range and a switch 64 is turned on, the process advances to step 3306. When the automatic transmission is in a drive range (one of the low, second, drive and reverse range) and the switch 64 is turned off, the process advances to step 3308.

In step 3306, reference rotating speed NFB is set to 700 rpm, and in the next step 3310, the rotation of 5 rpm is added to the previously set target rotating speed NF. Next, in step 3312, target rotating speed NF and reference rotating speed NFB are compared, and when NF>NFB, reference rotating speed NFB is set to be used for target rotating speed NF.

On the other hand, in step 3308, reference rotating speed NFB is set to 600 rpm, and in the next step 3316, the rotation of 5 rpm is subtracted from target rotating speed NF. Next, in step 3318, target rotating speed NF found in step 3316 and reference rotating speed NFB are compared, and when NF<NFB, reference rotating speed NFB is set as target rotating speed NF in step 3320.

In steps 3304–3320, the basic level of the target rotating speed is changed over according to the state of the automatic transmission whether it is in the neutral range or the drive range. Target rotating speed is not set according to the changed-over range right after the automatic transmission has been changed over between the neutral and drive range. The rotating speed is gradually changed to the target rotating speed as the time passes after the change-over. Specifically, right after the automatic transmission has been changed over from the neutral range to the drive range, target rotating speed NF is gradually reduced from 700 rpm to 600 rpm at a ratio of 5 rpm per 100 msec. On the contrary, right after the automatic transmission has been changed over from the drive range to the neutral range, target rotating speed NF is increased from 600 rpm to 700 rpm at a ratio of 5 rpm per 100 msec.

The reason why the basic level (reference rotating speed NFB) of the target rotating speed of the drive range is set lower than that of the neutral range is to prevent a creep. In step 3322 and step 3324, the position of the neutral switch 64 is checked, and when it is judged that the present state of the neutral switch is different from the previous state so that the range of the automatic transmission has been changed over, the integral term $u_I(i-1)$ stored in the aforementioned RAM is corrected once in the manner of feedforward in steps 3326 and 3328. Specifically, the automatic transmission is changed over from the drive range to the neutral range in step 3326 so that the load given to the engine 10 is decreased. Therefore, the integral term $u_I(i-1)$ is once decrease-corrected by $\beta_1$ after change-over. On the contrary, in step 3328, the load given to the engine 10 is increased. Therefore, the integral term $u_I(i-1)$ is once increase-corrected by $\alpha_1$ after change-over.

Next, in steps 3330 and 3332, it is judged whether an air-conditioner switch 62 has been changed over or not, that is, whether the air-conditioner installed in the vehicle has been turned on or not. When it is judged that the air-conditioner has been changed over from OFF to ON, the load given to the engine 10 is increased in step 3334, so that the integral term $u_I(i-1)$ is once increase-corrected by $\alpha_2$ after the change-over. On the contrary, when it is judged that the air-conditioner has been changed over from ON to OFF, the integral term $u_I(i-1)$ is once decrease-corrected by $\beta_2$ after the change-over.

Next, in steps 3338 and 3340, it is judged whether the variation in rotating speed which can be found by subtracting detected rotating speed Nen at the present proceeing timing from detected rotating speed Neo at the previous processing timing, especially the decrease, is larger than a predetermined value A or not. When the variation is larger than the predetermined value, the integral term uI(i−1) is increase-corrected by $\alpha_3$. Next, in steps 3342 and 3344, it is judged whether detected rotating speed Nen is in the range of upper limit $Ne_{max}$ (for example, 1600 rpm) and and lower limnit $Ne_{min}$ (for example, 400 rpm). When it is judged that detected rotating speed Nen is lower than lower limit $Ne_{min}$, the integral term $u_I(i-1)$ is increase-corrected by $\alpha_4$ in step 3346, and when it is judged that detected rotating speed Nen is higher than upper limit $Ne_{max}$, the integral term $u_I(i-1)$ is decrease-corrected by $\beta_4$ in step 3348.

Next, in step 3350, the aforementioned lower limit Nemin is substituted into Ne(i) which will be used in a calculation which will be described later. In step 3354, detected rotating speed Nen is substituted into Ne(i). That is, in steps 3350, 3352 and 3354, Ne(i) is limited into the predetermined upper and lower range ($Ne_{min}-Ne_{max}$).

In the next step 3356, the present integral term $u_I(i)$ is calculated according to equation (9) using NF, Ne(i) and $u_I(i-1)$ which are determined or corrected by the aforementioned processing. Then in the next steps 3358, 3360, it is judged whether the calculated integral term $u_I(i)$ is in a predetermined upper and lower limit (0%–100%) When the integral term $u_I(i)$ exceeds the upper limit (100%), the integral term u(i) is set to 100% in step 3362, and when the integral term $u_I(i)$ is lower than the lower limit (0%), the integral term $u_I(i)$ is set to 0% in step 3364. The upper and lower limit of this integral term $u_I(i)$ are set to a range in which the control value u(i) found by the aforementioned eighth equation can actually operate ISC valve 44.

In the next step 3366, the present control value u(i) is found according to equation (8). The values of Ne(i−1), u(i−1), u(i−2) and u(i−3) which are utilized for calculating the present control value u(i), are stored in the previous processing, being prepared for this feedback processing. The present state variable $X=[Ne(i)\ Ne(i-1)\ u(i-1)\ u(i-2)\ u(i-3)]^T$ can be set according to these Ne(i−1), u(i−1), u(i−2), u(i−3), and Ne(i) which is found by the present processing.

In other words, in step 3366, the present state variable X which has been set in the aforementioned manner and the most optimum feedback gain $K=[K_1, K_2, K_3, K_4]$ are calculated by means of matrix calculation, and further the present integral term $u_I(i)$ is added so that the present control value u(i) is determined. The values of Ne(i) and Ne(i−1) in the aforementioned state variable X are limited to be in a predetermined upper and lower limit by the aforementioned processing of steps 3342, 3344, 3350, 3352 and 3354.

Next, in steps 3368 and 3370, it is judged whether the present control value u(i) calculated in step 3366 is in a predetermined upper and lower limit (0%−100%) or not. When it exceeds the upper limit (100%), the present control value u(i) is set to 100% in step 3372, and when it is lower than the lower limit (0%), the present control value u(i) is set to 0%. The upper and lower limit of the control value u(i) is set in such a manner that it is in a range within which ISC valve 44 can be actually operated. When the control value u(i) is limited in the predetermined range, u(i−1), u(i−2) and u(i−3) at the aforementioned state variable X are also limited within the upper and lower limit (0%-100%).

In step 3376, a control signal of the duty ratio according to the present control value u(i) determined in the manner described above, is outputted from the output port 58 to ISC valve 44.

When it is judged in the aforementioned step 3302 that the feedback conditions are not satisfied, the process advances to the open processing in step 3390.

FIG. 26 shows the content of the open processing. In this open processing, the present control value u(i) is set to the predetermined value $u_0$ in step 3402. This predetermined value $u_0$ may be an arbitrary value such as 100%, 0% and 50% as a duty ratio, or it may be a value determined according to a detected parameter such as a cooling water temperature Thw. Next, in steps 3404, 3406, 3408, 3410 and 3412, upper limit $Ne_{max}$ and lower limit $Ne_{min}$ at detected rotating speed Nen and idling rotating speed are compared in the same manner as the aforementioned steps 4344, 3344, 3350 and 3354. When $Nen<Ne_{min}$, $Ne_{max}$ is substituted into Ne(i). When $Nen<Ne_{min}$, $Ne_{min}$ is substituted into Ne(i). When $Ne_{min} \leqq Nen \leqq Ne_{max}$, Nen is substituted into Ne(i). Next, in step 3414, the control value u(i) which has been set this time and the integral term $u_I(i)$ which agrees with the present state variable, are reversely calculated according to the eighth equation from; Ne(i) which have been set in steps 3408, 3410 and 3412; Ne(i 1), u(i−1), u(i−2) and u(i−3) which have been stored in RAM 53; and the present control value u(i) which has been set in step 3402.

The state variable in this open processing can be expressed by [Ne(i) Na(i−1) u(i−1) u(i−2) u(i−3)] from; Ne(i) which has been set in steps 3408, 3410 and 3412; and Ne(i−1), u(i−1), u(i−2) and u(i−3) which are stored in RAM 53.

In the following steps 3416, 3418, 3420 and 3422, it is judged whether the integral term uI(i) found in the aforementioned step 3414 is in the upper and lower limit of 0%-100% or not. When it excees 100%, the integral term $u_I(i)$ is set to 100%. On the contrary, when it is lower than 0%, the integral term $u_I(i)$ is set to 0%. After the aforementioned processing has been completed, the process advances to the aforementioned step 3376.

After processing has been carried out in step 3376, in step 3378, the values of Ne(i), u(i−2) and u(i−1) in the state variable which has been set either in the feedback processing of steps 3304–3374 or in the open processing of step 3390, are respectively substituted into Ne(i−1), u(i−3) and u(i−2), and then the present control value u(i) which has been determined in the aforementioned feedback processing or open processing, and $u_I(i)$, are respectively substituted into u(i−1) and $u_I(i-1)$.

Next, in step 3380, the values of Ne(i−1), u(i−3), u(i−2), u(i−1) and $u_I(i-1)$ which have been determined in the aforementioned step 3378 are stored in RAM 53.

That is, in the aforementioned storing processing, the state variable which is stored, being prepared for the next feedback processing and the reverse calculation processing of the integral term in the next open processing, is renewed and stored, utilizing Ne(i), u(i−2), and u(i−1) used in the feedback processing and open processing, and utilizing the control value u(i) determined in each processing. The integral term $u_I(i)$ determined in the feedback processing is also stored, being prepared for the next feedback processing. The integral term $u_I(i)$ calculated in the open processing is also stored as the initial value used when the integral term is calculated according to the equation (9) in the next feedback processing. Moreover, in this embodiment, the values are stored after they have been changed into the form which can be used in the processing of the next calculation timing (step 3378).

Consequently, according to the control program of the aforementioned ISC valve 44, the stored integral term $u_I(i-1)$ is corrected only once in the manner of feedforward corresponding to the change of load given to the engine 10 which is caused when the air-conditioner or automatic transmission is operated. Therefore, the integral term $u_I(i)$ is not influenced by the aforementioned feedback and feedforward processing and can be fully changed in the range of the upper and lower limit. Accordingly, the following problem caused in conventional technique can be solved: although the detected rotating speed is higher than the target rotating speed, the control value $u_I(i)$ can not be reduced so that ISC valve 44 can not be closed.

In the case where the idling speed is suddenly decreased, the integral term $u_I(i-1)$ is immediately corrected in the manner of feedforward, so that engine stall can be sufficiently prevented even when the load given to the engine 10 is suddenly increased by a disturbance caused by some reasons. Furthermore, when the idling engine speed has reached a predetermined upper and lower limit, the integral term $u_I(i-1)$ is corrected in the manner of feedforward so that the idling engine speed can be settled in the range of the upper and lower limit. Therefore, even when the idling engine speed extremely deviates from the target rotatng speed and reaches the upper or lower limit, the opening of ISC valve 44 is increased or decreased corresponding to the aforementioned feedforward correction, so that the idling engine speed can be immediately returned to the target rotating speed side. Moreover, feedback processing is simultaneously conducted, so that the idling rotating speed can be smoothly returned to the target rotating speed.

In the aforementioned processing, when open processing is conducted, the renewal of a state variable and the reverse operation of integral term uI(i) are carried out, being prepared for the next feedback processing, so that the idling rotating speed immediately after the state has been changed from the open processing into the feedback processing, can be smoothly and quickly settled to the target value.

When the target rotating speed is suddenly changed in the aforementioned idling engine speed control in which recent control having excellent response property is utilized, an extreme overshoot and undershoot are caused, so that the engine speed is varied sharply.

However, in the aforementioned processing, the target rotating speed is not changed over immediately after the automatic transmission has been changed over between the neutral range and the drive range, but the target rotating speed is gradually changed over to the value corresponding to the directed range as the time passes. Accordingly, the aforementioned extreme variation in engine speed is not caused by the overshoot and undershoot. Further, in the aforementioned processing, when the automatic transmission is shifted to the drive range, the target rotating speed is lowered in order to prevent a creep. Therefore, when the engine load is increased, the target rotating speed is decreased, so that there is a high possibility of engine stall. However, the control is conducted in the manner described before, so that the present invention is especially effective in the case where the target rotating speed must be lowered although the load is increased, and this technique is essential in the idling engine speed control in which recent control having excellent response property is utilized.

In the aforementioned processing shown in FIG. 25, the present integral term $u_I(i)$ is obtained in such a manner that: the stored integral term $u_I(i-1)$ is corrected in the manner of feedforward; accumulation processing is conducted on the corrected integral term $u_I(i-1)$ in accordance with the difference between NF and Ne(i). However, the integral term corrected in the manner of feedforward may be used for the present integral term $u_I(i)$, and accumulation processing may not be conducted on the aforementioned integral term corrected in the manner of feedforward in accordance with the difference between NF and Ne(i).

In the aforementioned processing, in step 3342–step 3354, the upper and lower limit with regard to detected rotating speed Nen for correcting the integral term $u_I(i-1)$ in the manner of feedforward, and the upper and lower limit of Ne(i) used for a state variable, are set to the same values of $Ne_{max}$ and $Ne_{min}$. However, the upper and lower limit may be respectively set to different values.

In the aforementioned processing, when the range of the automatic transmission is changed over, when the air-conditioner is changed over, when the engine speed is suddenly lowered, and when the engine speed has reached the upper or lower limit, the stored integral term $u_I(i-1)$ is directly incresed or decreased by predetermined values ($\alpha_1$, $\alpha_2$, $\alpha_3$, $\alpha_4$, $\beta_1$, $\beta_2$, and $\beta_4$) so that the integral term $u_I(i)$ is corrected. However, as illustrated in FIG. 25, the integral term $u_I(i)$ may be corrected in such a manner that: the target rotating speed NF which has been set at the time is adjusted corresponding to the aforementioned variation, and a temporary target rotating speed NF′ is made. In FIG. 25, specifically, when the process advances to step 3365 through one of step 3322 and step 3324, step 3330, step 3332, step 3338, step 3342, step 3344, and step 3354 without causing the aforementioned changes, the same processing as described above, is carried out. On the contrary, when one of the aforementioned changes is caused, the temporary target rotating speed NF′ is set in one of step 3326′, step 3328′, step 3334′, step 3336′, step 3340′, step 3346′, and step 3348′, and then the present integral term uI(i) can be determined in step 3365′.

When the process advances to step 3365′ through step 3326′, step 3328′, step 3334′, step 3336′ and step 3340′, the setting process of Ne(i) is previously conducted, that is, Ne(i) is previously set by the same processing as that in steps 3342, 3344, 3350, 3352 and 3354.

In the aforementioned embodiment, explanations have been conducted on the apparatus in which the state variable is constructed, using the past input and output data. Referring to FIG. 6, an embodiment will be explained in which the state variable is estimated with the state observation unit shown in the official gazette of Japanese Patent Application Laid Open No. 46353-1984.

The total control program of ISC valve 44 is essentially the same as that described in FIG. 3. Essential technique is shown in the aforementioned official gazette, so that the explanation will be omitted.

In FIG. 28, steps 3302–3348 are the same as those shown in FIG. 3. After the processing of one of steps 3344, 3346 and 3348 has been completed, the integral term $u_I(i-1)$ which is stored at the previous calculation timing in step 3602 and corrected in the aforementioned processing of steps 3304–3348 when necessary, is found, and the integral term $u_I(i)$ is found according to the deviation of detected rotating speed Nen from target rotating speed NF. Next, in step 3604, it is judged whether the found integral term $u_I(i)$ is in the upper and lower limit ($-u_a \sim 100-u_a$) or not. When the integral term $u_I(i)$ is out of the range, it is restricted by the upper limit $100-u_a$ or the lower limit -ua in step 3606. In step 3608, slip ΔN of detected rotating speed from reference setting value Na (for example, 650 rpm) is calculated. In step 3616, state variables $X_1(i-1)$, $X_2(i-1)$, $X_3(i-1)$ which are stored in the previous calculation timing, increment $\Delta u(i-1)$ of the control value u(i) with regard to the reference setting value ua, which is also stored, and slip ΔN which is found in step 3608, are weighted and added so that state variables $X_1(i)$, $X_2(i)$, $X_3(i)$ and $X_4(i)$ are found. In steps 3612 and 3614, it is judged whether the values of state variables $X_1(i)-X_4(i)$ which are found in step 3610 are in the range of a predetermined upper and lower limit or not. When the state variables are out of the range, they are restricted by the upper or lower limit. In step 3616, the present integral term $u_I(i)$ which has been obtained through the processing of steps 3602–3606, and the present state variables $X_1(i)$, $X_2(i)$, $X_3(i)$ $X_4(i)$, are multiplied by the most optimum gains $K_1$, $K_2$, $K_3$, $K_4$, $K_5$and added so that the present increment value Δu(i) is found. In step 3618, the control value u(i) is found from the reference setting value ua and the increment Δu(i). In steps 3620 and 3622, it is judged whether the control value u(i) found in step 3618 is in the range of a predetermined upper and lower limit (0–100) or not. When the control value u(i) is out of the range, it is restricted by the upper limit (100) or the lower limit (0) so that the present control value u(i) is determined. In step 642, a control signal of the duty ratio corresponding to the determined present control value u(i) is outputted from the output port 58 into ISC valve 44.

In the open processing conducted when it is judged in step 3302 that the feedback condition is not satisfied, the present control value u(i) is set to a predetermined value $u_0$ in step 3624. This predetermined value u0 is the same as that in step 3402 in the aforementioned embodiment. In step 3626, the present increment Δu(i) is found from the control value u(i) which has been set in step 3624 and the reference setting value ua. In step 3628, a slip ΔN is calculated which is a slip of detected rotating speed Nen from reference setting value Na. In the same manner as the aforementioned embodiment, in step 3630, state variables $X_1(i)$, $X_2(i)$, $X_3(i)$ and $X_4(i)$ in this open state are found by the same processing as that used in step 3610, preparing for the next feeback processing. In steps 3632 and 3634, values $X_1(i)$–$X_4(i)$ composing the state variable are restricted into the range of the upper and lower limit by the same processing as that in steps 3612 and 3614. In step 3636, the integral term $u_I(i)$ is reversely calculated in the same manner as the aforementioned embodiment according to the present increment $\Delta u(i)$ and state variables $X_1(i)$, $X_2(i)$, $X_3(i)$ and $X_4(i)$ which have been found through the steps of the aforementioned open processing. In steps 3638 and 3640, the integral term $u_I(i)$ which have been found in the same manner as steps 3604 and 3606, is restricted into the range of the upper and lower limit. In step 3642, a control signal of the duty ratio corresponding to the control value $u_I(i)$ which has been set in step 3624, is outputted from the output port 58 into ISC valve 44.

In step 3644, being prepared for the next feedback processing, $X_1(i)$, $X_2(i)$, $X_3(i)$, $\Delta u(i)$ and $u_I(i)$ at the present calculation timing which have been determined through either the aforementioned feedback processing or the open processing, are respectively set to $X_1(i-1)$, $X_2(i-1)$, $X_3(i-1)$, $\Delta u(i-1)$ and $u_I(i-1)$. In step 646, these $X_1(i-1)$, $X_2(i-1)$, $X_3(i-1)$,$\Delta u(i-1)$ and $u_I(i-1)$ are stored in RAM 53 so that the present calculation and cotrol processing is completed and other procssing is started.

In the aforementioned embodiment, "after a warm-up operation" is adopted for one of the F/B conditions. This condition may be eliminated and the F/B processing may be started while the engine is in a warm-up operation. However, it is desirable to install a mechanical air valve in parallel with ISC valve 44 in order to supply air in an idling operation.

In the aforementioned embodiment, the calculation is performed at a constant period. However, the calculation may be carried out each time when a predetermined rotating angle is detected.

In the aforementioned embodiment, target rotating speed NF is gradually changed by the processing of steps 3304–3320 shown in FIG. 25 when the range of the automatic transmission is changed over, so that while target rotating speed NF is being changed, detected rotating speed Nen differs from target rotating speed NF. Therefore, the processing of step 3356 in FIG. 25 is conducted in accordance with the following equation.

$$u_I(i) = 2 \cdot u_I(i-1) - u_I(i-2) + Ka \cdot (NF - Ne(i))$$

Figure 27:
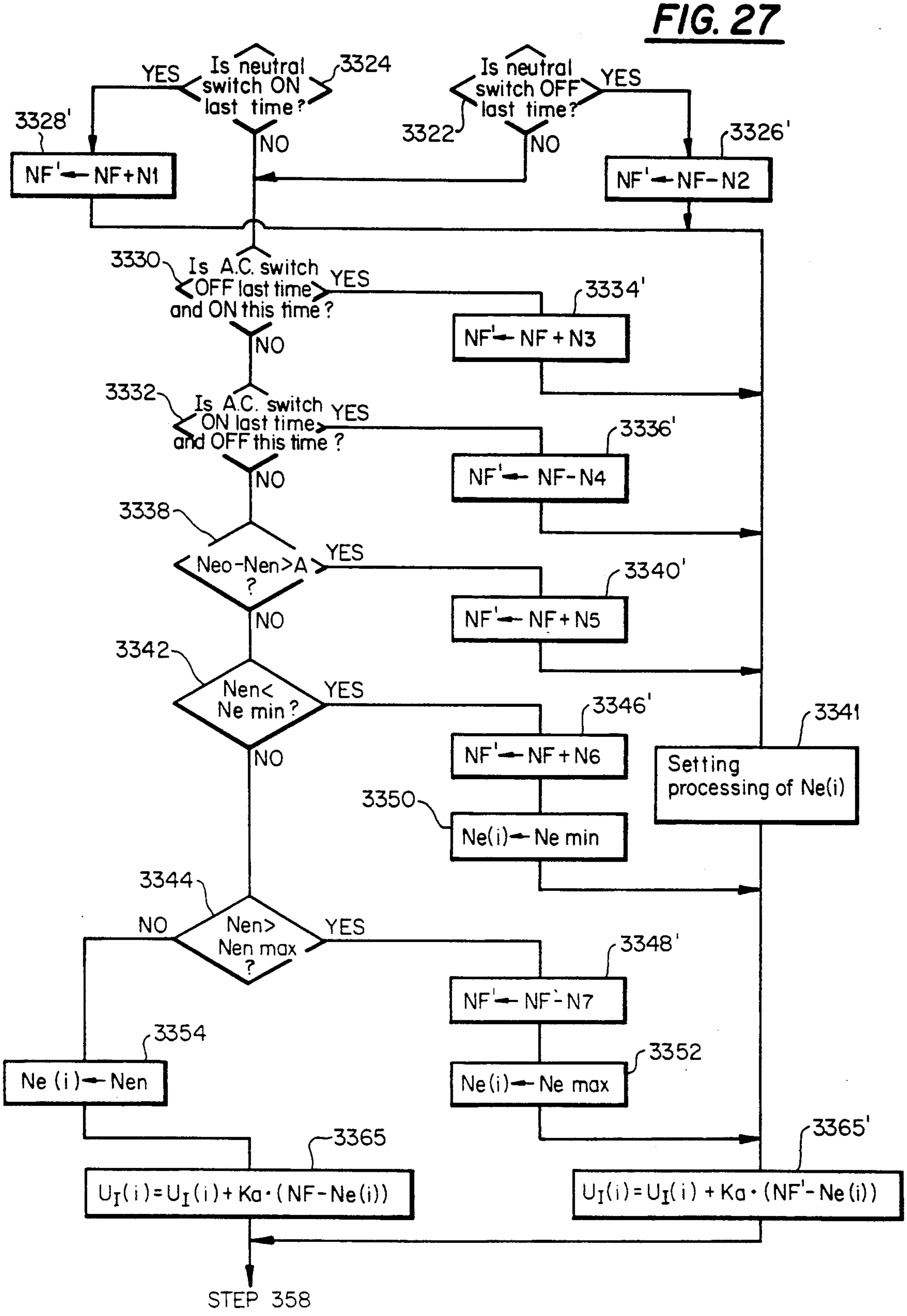

In accordance with this processing, the processing of $u_I(i-2) \leftarrow u_I(i-1)$ is added in step 3378, and $u_I(i-2)$ is also stored in step 3380. When the aforementioned measures are taken, even when target rotating speed NF is changed in the way described above, detected rotating speed Nen can follow target rotating speed NF without a slip or with an extremely small slip. With regard to step 3365' in FIG. 27 a nd step 3602 in FIG. 28, situations are the same.

As described above, according to this embodiment, when the state of load is detected by the state change detecting menas, the integral value which is calculated by the integral value calculating means is corrected in the manner of feedforward, before the integral value is restricted into a predetermined range in accordance with the sate change by the integral value restricting means, so that the integral value can be fully varied within the predetermined range, and even when a feedforward correction is conducted in accordance with a load disturbance, the control value can be also varied within the predetermined range. Consequently, the following conventional problems can be solved: even when a detected rotating speed is higher than a target rotating speed and the final control value is made minimum, if a load disturbance is given and correction is conducted, the rotating speed can not become not more than a value which is larger than the lower limit of the final control value by a predetermined value; and the idle control value is maintained open by a predetermined open value, so that the detected rotating speed can not be converted to the target rotating speed, and the rotating speed is maintained high. Accordingly, the present invention can provide an excellent effect that the detected rotating speed can be accurately converged to the target rotating speed.

INDUSTRIAL APPLICABILITY

As the detail has been described above, especially in the idling rotating speed control unit of an internal combustion engine, it is possible to quickly converge an actual rotating speed to a target rotating speed even when there is a disturbance.

We claim:

1. A speed control unit for an internal combustion engine which operates at an engine speed, comprising:

detecting means for outputting a first signal indicative of a detected engine speed of the internal combustion engine;

control means for receiving the first signal, for calculating first and second values of a present control variable and for outputting a control signal indicative of a selected one of the first or second values of the present control variable to an adjusting means, the control means comprising first means for determining whether the internal combustion engine is operating in a first or second state, first control variable setting means (1) for setting a state variable to a first present value in accordance with the first signal, a first previous value of the state variable and the first value of the present control variable and (2) for setting the present control variable to a value corresponding to the first value thereof;

second control variable setting means (1) for setting the state variable to a second present value in accordance with the first signal, a second previous value of the state variable and the second value of the present control variable and (2) for setting the present control variable to a value independent of the second value thereof;

first selecting means for selecting (1) the first control variable setting means when the internal combustion engine operates in the first state so that the control signal is indicative of the first value of the present control variable or (2) the second control variable setting means when the internal combustion engine operates in the second state so that the control signal is indicative of the second value of the present control variable; and the adjusting means responsive to the control signal such that the adjusting means is controlled at a predetermined cycle for causing the engine speed to coincide with a target engine speed.

2. The speed control unit according to claim 1, wherein the first control variable setting means comprises integral variable calculating means for calculating a present value of an integral variable in accordance with (1) a deviation between the detected engine speed and the target engine speed and (2) a previous value of the integral variable; and means for calculating the first value of the present control variable in accordance with the first present value of the state variable and the present value of the integral variable.

3. The speed control unit according to claim 2, wherein the integral variable calculating means comprises means for setting the present value of the integral variable to an initial value in accordance with the second value of the present control variable and the second present value of the state variable.

4. The speed control unit according to claim 3, wherein the first state comprises a feed back state of the internal combustion engine.

5. The speed control unit according to claim 4, wherein the control means further comprises means for setting the target engine speed to an initial value corresponding to the detected engine speed after the internal combustion engine changes from operating in an open state to the feed back state; and means for changing, at a predetermined rate, the target engine speed from the initial value to a first predetermined value.

6. The speed control unit according to claim 5, wherein the first selecting means further comprises second selecting means for selecting the second control variable setting means when the first value of the present control variable is outside a predetermined range.

7. The speed control unit according to claim 6, wherein the first selecting means further comprises third selecting menas for selecting the second control variable setting means when the deviation between the detected engine speed and the target engine speed is not more than a second predetermined value.

8. The speed control unit according to claim 7, wherein the second control variable setting means comprises means for resetting the second value of the present control variable to a value corresponding to a previous value of the control variable.

9. The speed control unit according to claim 8, wherein the means for resetting comprises means for correcting the first value of the present control variable by predetermined filtering processing.

10. A speed control unit for an internal combustion engine which operates at an engine speed, comprising:

detecting means for outputting a first signal indicative of a detected engine speed of the internal combustion engine;

control means for receiving the first signal, for calculating first and second values of a control variable and for outputting a control signal indicative of a selected one of the first or second values of the control variable to an adjusting means, the control means comprising first means for determining whether the internal combustion engine is operating in a first or second state, first calculation processing means (1) for setting a present value of a state variable in accordance with the detected engine speed, a previous value of the state variable and a value relating to the control variable, (2) for setting the first value of the control variable to a value corresponding to an integral variable having a value corresponding to the detected engine speed and the present value of the state variable, and (3) for storing the present value of the state variable for a next feedback calculation at a predetermined cycle;

second calculation processing means (1) for resetting the previous value of the state variable in accordance with the detected engine speed, the present value of the state variable and a value relating to the control variable, (2) for setting the second value of the control variable to a predetermined value, and (3) for storing the present value of the state variable for the next feedback calculation at the predetermined cycle;

selecting means for selecting (1) the first calculation processing means when the internal combustion engine operates in the first state so that the control signal is indicative of the first value of the present control variable or (2) the second calculation processing means when the internal combustion engine operates in the second state so that the control signal is indicative of the second value of the present control variable; and the adjusting means responsive to the control signal such that the adjusting means is controlled at the predetermined cycle for causing the engine speed to coincide with a target engine speed.

11. A control unit for an internal combustion engine which operates at an engine speed, comprising:

detecting means for outputting a first signal indicative of a detected engine speed of the internal combustion engine;

control means for receiving the first signal, for calculating a value of a control variable and for outputting a control signal indicative of the value of the control variable to an adjusting means;

the control means comprising setting means for setting a value of a state variable according to the detected engine speed, a previous value of the state variable and a value relating to the control variable;

state variable restricting means for determining whether the value of the state variable is within a first predetermined range and for assigning the state variable a restricted value within the first predetermined range when the value of the state variable is determined to be outside the first predetermined range;

calculating means for calculating a value of an integration variable corresponding to a deviation between the detected engine speed and a target engine speed;

integration variable restricting means for determining whether the value of the integration variable is within a second predetermined range and for assigning the integration variable a restricted value within the second predetermined range when the value of the integration variable is determined to be outside the second predetermined range;

means for calculating the value of the control variable in accordance with the restricted values of the state variable and the integration variable;

control variable restricting means for determining whether the value of the control variable is within a third predetermined range and for assigning the control variable a restricted value within the third predetermined range when the value of the control variable is determined to be outside the third predetermined range;

means for detecting a change of a load provided to the internal combustion engine and for correcting the value of the integration variable in accordance with a detected change of the load; and the adjusting means responsive to the control signal such that the adjusting means is controlled at a predetermined cycle for causing the engine speed to coincide within the target engine speed.

12. The speed control unit according to claim 11, wherein the internal combustion engine is coupled to a vehicle having an automatic transmission which operates in a drive range and a neutral range, and wherein the change of the load is the change-over between the drive range and neutral range of the automatic transmission.

13. The speed control unit according to claim 12, wherein the control means comprises range means for determining whether the automatic transmission is in the drive range or the neutral range; and means for setting the target engine speed according to the range determined by the range means and for gradually changing the target engine speed in response to a change in the range of the automatic transmission.

14. The speed control unit according to claim 13, wherein the value of the integration variable is calculated according to the deviation between the detected engine speed and the target engine speed, a first prior value of the integration variable calculated at a time prior to calculating the value of the integration variable, and a second prior value of the integration variable calculated at a time prior to calculating the value of the first prior value of the integration variable.

15. A control unit, comprising:

means for detecting an operating state of an object to be controlled and for providing a first signal indicative of a detected operating state;

means for calculating present control data for controlling an actuating means at a predetermined period according to the detected operating state, and for outputting a control signal to the actuating means in accordance with the present control data, the control signal corresponding to a value of a state variable so that the operating state of the object to be controlled is a predetermined state, the means for calculating comprising means for determining the value of the state variable on the basis of a previously constructed dynamic model in accordance with prior control data calculated at a time prior to calculating the present control data and the detected operating state;

the dynamic model comprising a first dynamic model in which dead time is identified by a discrete system, the dead time commencing at a time when the control signal is received by the actuating means and ending when the operating state begins to change, and a second dynamic model in which a portion of time after the dead time is identified by the discrete system; and the actuating means responsive to the control signal such that the actuating means is controlled at the predetermined period for adjusting the operating state of the object.

16. A speed control unit for an internal combustion engine which operates at a rotating speed, comprising:

means for detecting the rotating speed of the internal combustion engine and for outputting a first signal indicative of a detected rotating speed;

control means for receiving the first signal, for calculating present control data in accordance with the first signal and for outputting a control signal indicative of the present control data for controlling an actuating means at a predetermined period, the control means comprising means for determining the value of a state variable on the basis of a dynamic model in accordance with prior control data calculated at a time prior to calculating the present control data and the detected rotating speed;

the dynamic model comprising a first dynamic model in which the dead time is identified by a discrete system, the dead time commencing at a time when the control signal is received by the actuating means and ending when the rotating speed begins to change, and a second dynamic model in which a portion of time after the dead time is identified by the discrete system; and the actuating means responsive to the control signal such that the actuating means is controlled at the predetermined period for causing the engine speed to coincide with a target engine speed.

17. The speed control unit according to claim 16, wherein the portion of time after the dead time is 1/N of the dead time wherein N is an integer.

* * * * *

UNITED STATES PATENT AND TRADEMARK OFFICE
CERTIFICATE OF CORRECTION

PATENT NO. : 5,313,395

DATED : May 17, 1994

INVENTOR(S) : KAWAI ET AL

It is certified that error appears in the above-identified patent and that said Letters Patent is hereby corrected as shown below:

On the title page, item [75]

Inventors: "Katsuhiko Kawai, Kariya; Tasunori "

change to

-- Inventors: Katsuhiko Kawai, Kariya; Tatsunori --

Signed and Sealed this

Fifth Day of September, 1995

Attest:

BRUCE LEHMAN

*Attesting Officer*

*Commissioner of Patents and Trademarks*